US012627507B2

(12) United States Patent
Kasamatsu

(10) Patent No.: US 12,627,507 B2
(45) Date of Patent: May 12, 2026

(54) APPARATUS AND METHOD FOR PROVIDING SERVICES WITH A BLOCKCHAIN SYSTEM

(71) Applicant: Takuma Kasamatsu, Tokyo (JP)

(72) Inventor: Takuma Kasamatsu, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 524 days.

(21) Appl. No.: 17/943,209

(22) Filed: Sep. 13, 2022

(65) Prior Publication Data

US 2023/0006839 A1     Jan. 5, 2023

Related U.S. Application Data

(63) Continuation of application No. PCT/JP2021/008713, filed on Mar. 5, 2021.

(30) Foreign Application Priority Data

Mar. 18, 2020     (JP) ................................. 2020-047127
Feb. 25, 2021     (JP) ................................. 2021-029164

(51) Int. Cl.
*H04L 9/32*        (2006.01)
*G06Q 50/06*        (2024.01)
*H04L 9/08*        (2006.01)

(52) U.S. Cl.
CPC ............ *H04L 9/3263* (2013.01); *H04L 9/085* (2013.01); *H04L 9/088* (2013.01); *G06Q 50/06* (2013.01)

(58) Field of Classification Search
CPC ....... H04L 9/3263; H04L 9/085; H04L 9/088; H04L 9/50; G06Q 50/06; G06Q 30/06; G06F 16/9032
See application file for complete search history.

(56) References Cited

U.S. PATENT DOCUMENTS 11,651,352 B2 *     5/2023     Gaddam .............. G06Q 20/386
                                                                 705/66
2018/0183687 A1 *     6/2018     Dementev ............... H04L 41/50
2019/0340623 A1 *     11/2019     Rivkind .................. G06F 21/31
(Continued)

FOREIGN PATENT DOCUMENTS

JP          2014-021918          2/2014
JP          2016-095731          5/2016
(Continued)

OTHER PUBLICATIONS

International Search Report issued on Aug. 8, 2021 in PCT/JP2021/008713 filed on Mar. 5, 2021, 6 pages.

*Primary Examiner* — Jung W Kim
*Assistant Examiner* — James P Moles
(74) *Attorney, Agent, or Firm* — XSENSUS LLP

(57)          ABSTRACT
An apparatus for providing services, includes: circuitry that: receive, from a communication terminal of a user, a request for obtaining a particular item of one or more items provided by one or more service providers, information on the one or more items being managed on a blockchain system; transmits, to the blockchain system, a request for changing information on a use right of the particular item to indicate transfer of the use right to the user; and provides the particular item to the communication terminal of the user having the use right of the particular item.

4 Claims, 33 Drawing Sheets

(56) References Cited

U.S. PATENT DOCUMENTS

| | | | |
|---|---|---|---|
| 2020/0051166 A1* | 2/2020 | Loh | H04L 9/0637 |
| 2020/0134585 A1* | 4/2020 | Xu | H04L 9/3236 |
| 2021/0098988 A1* | 4/2021 | Gokhale | H02J 3/381 |
| 2021/0166247 A1* | 6/2021 | Sirigiri | G06F 16/27 |
| 2021/0176075 A1* | 6/2021 | Chu | H04L 9/3239 |

FOREIGN PATENT DOCUMENTS

| | | | | |
|---|---|---|---|---|
| JP | 2019-197597 | | 11/2019 | |
| JP | 2019197597 A | * | 11/2019 | |
| JP | 2020-009334 | | 1/2020 | |
| JP | 2020-013259 | | 1/2020 | |
| JP | 2020009334 A | * | 1/2020 | |
| JP | 2020-030610 | | 2/2020 | |
| JP | 2020030610 A | * | 2/2020 | |
| WO | WO-2019141511 A1 | * | 7/2019 | G06Q 50/06 |
| WO | WO-2019163040 A1 | * | 8/2019 | |

* cited by examiner

FIG. 1

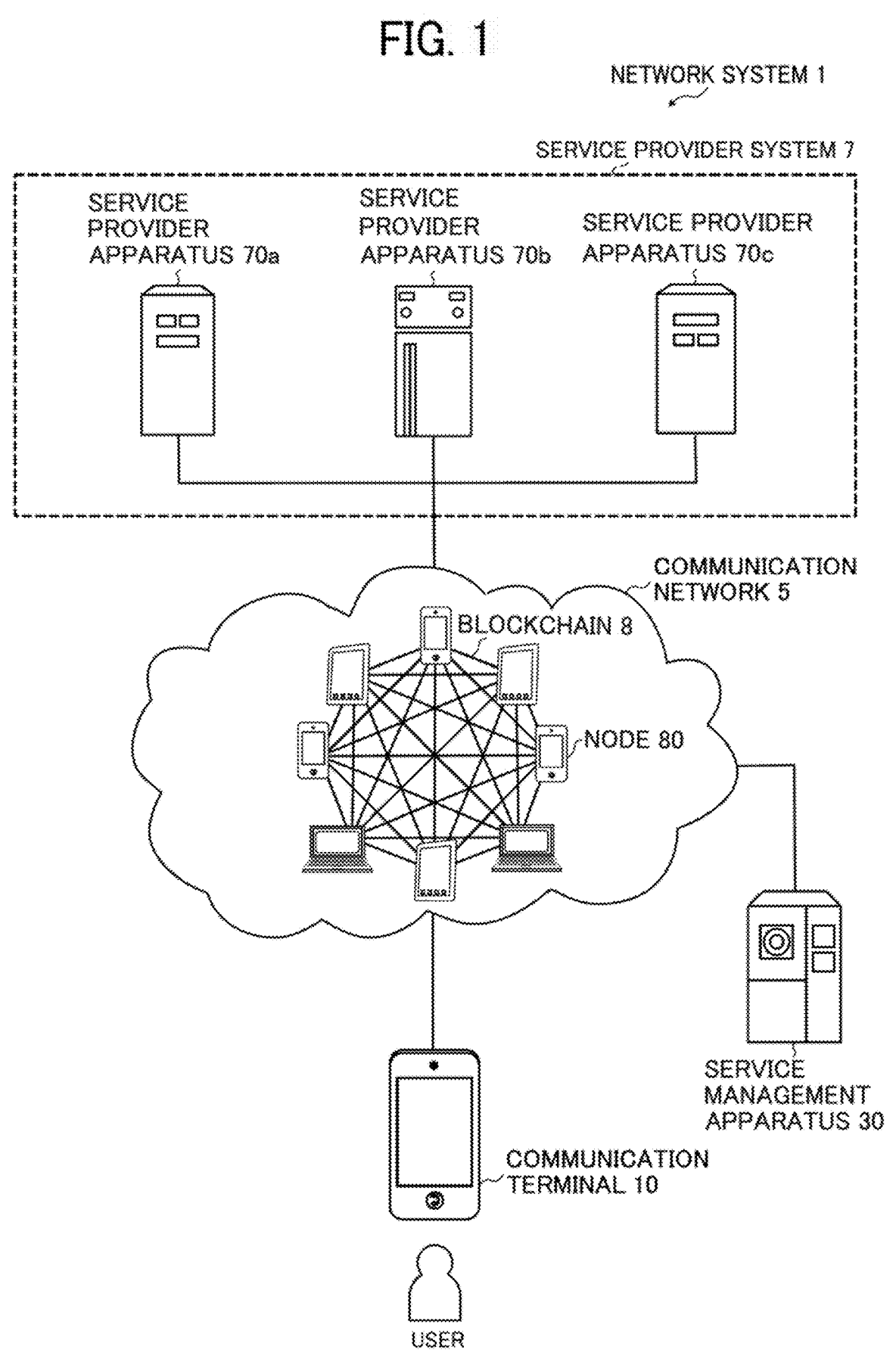

NETWORK SYSTEM 1

SERVICE PROVIDER SYSTEM 7

SERVICE PROVIDER APPARATUS 70a

SERVICE PROVIDER APPARATUS 70b

SERVICE PROVIDER APPARATUS 70c

COMMUNICATION NETWORK 5

BLOCKCHAIN 8

NODE 80

SERVICE MANAGEMENT APPARATUS 30

COMMUNICATION TERMINAL 10

USER

FIG. 6A

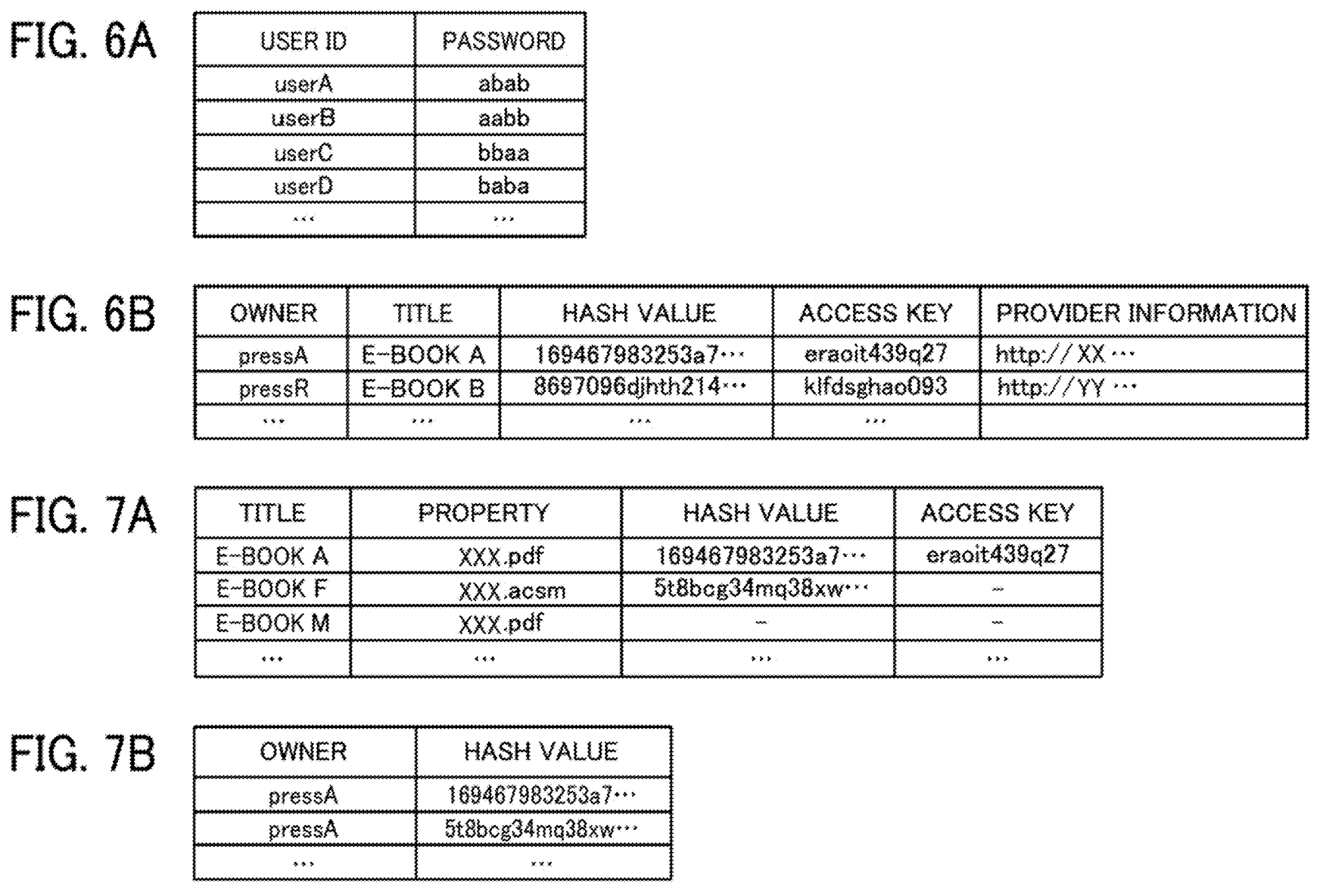

| USER ID | PASSWORD |
|---|---|
| userA | abab |
| userB | aabb |
| userC | bbaa |
| userD | baba |
| ... | ... |

FIG. 6B

| OWNER | TITLE | HASH VALUE | ACCESS KEY | PROVIDER INFORMATION |
|---|---|---|---|---|
| pressA | E-BOOK A | 1694679832253a7··· | eraoit439q27 | http://XX··· |
| pressR | E-BOOK B | 8697096djhth214··· | kifdsghao093 | http://YY··· |
| ... | ... | ... | ... | |

FIG. 7A

| TITLE | PROPERTY | HASH VALUE | ACCESS KEY |
|---|---|---|---|
| E-BOOK A | XXX.pdf | 1694679832253a7··· | eraoit439q27 |
| E-BOOK F | XXX.acsm | 5t8bcg34mq38xw··· | : |
| E-BOOK M | XXX.pdf | : | : |
| ... | ... | ... | ... |

FIG. 7B

| OWNER | HASH VALUE |
|---|---|
| pressA | 1694679832253a7··· |
| pressA | 5t8bcg34mq38xw··· |
| ... | ... |

Figure 9:
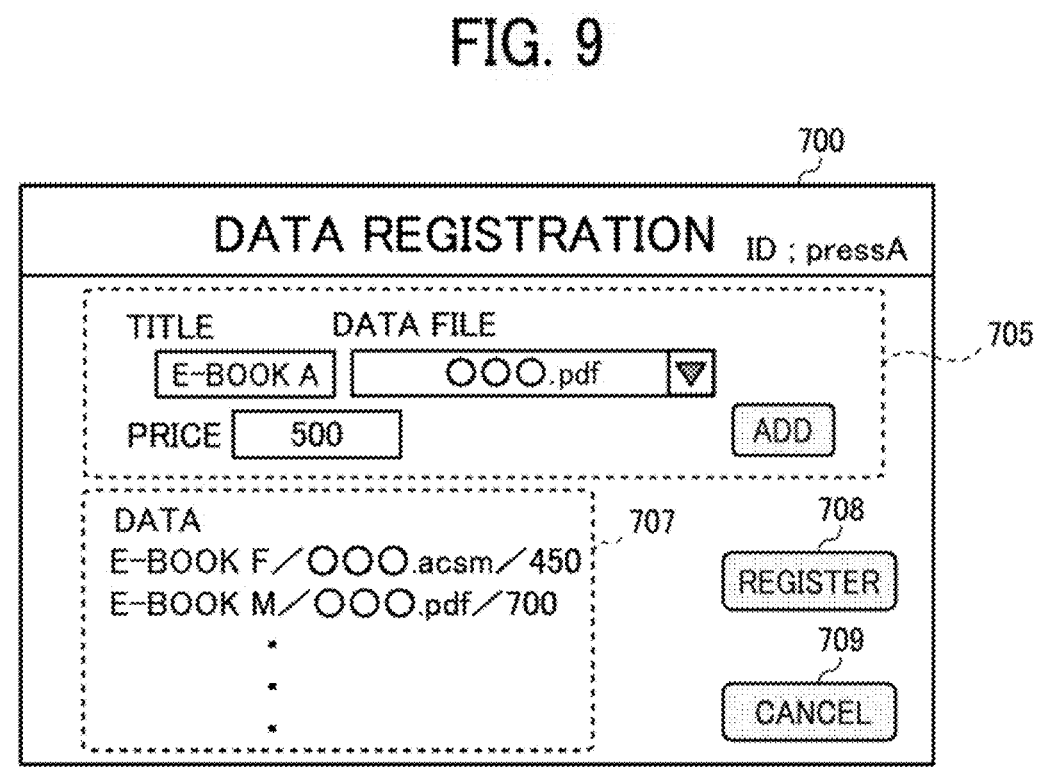

DATA REGISTRATION  ID ; pressA

TITLE          DATA FILE                                          705

| E-BOOK A |   | ○○○.pdf ▽ |

ADD

PRICE | 500 |

DATA                                   707              708
E-BOOK F／○○○.acsm／450
E-BOOK M／○○○.pdf／700        REGISTER
        *
        *                                              709
        *

CANCEL

FIG. 10

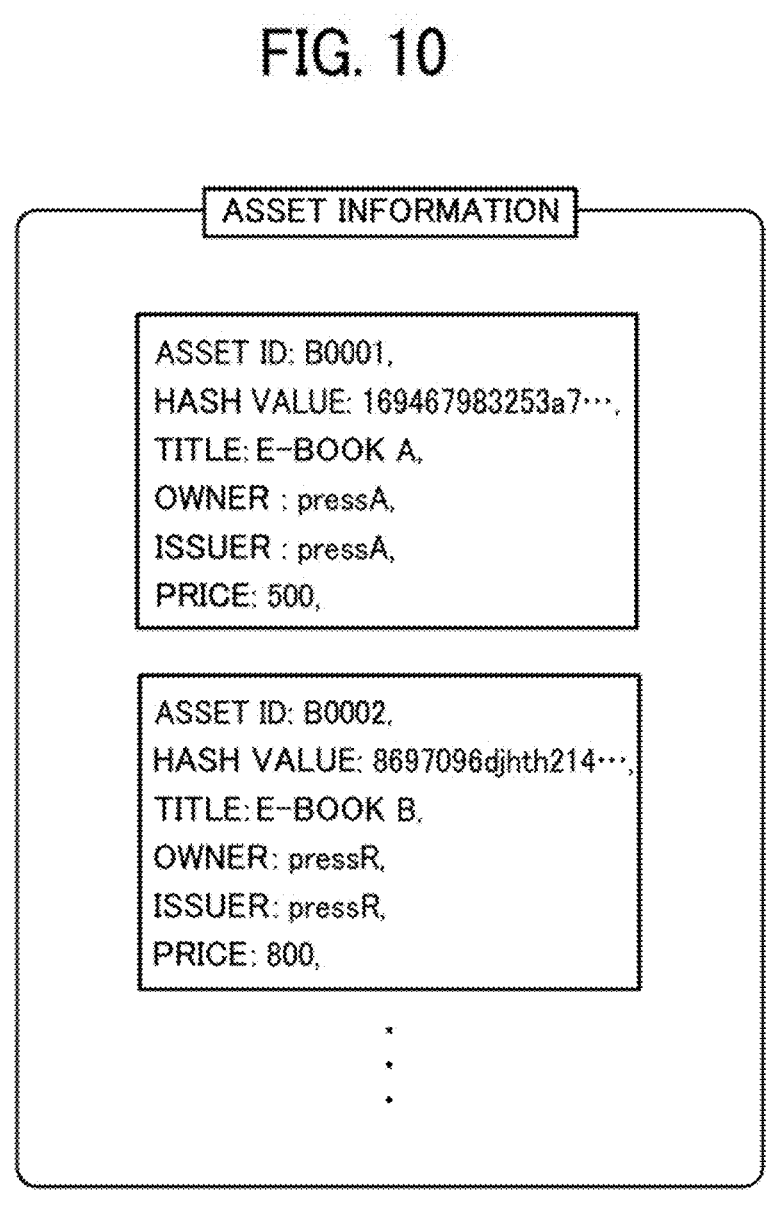

ASSET INFORMATION

ASSET ID: B0001,
HASH VALUE: 169467983253a7···,
TITLE: E-BOOK A,
OWNER : pressA,
ISSUER : pressA,
PRICE: 500, ASSET ID: B0002,
HASH VALUE: 8697096djhth214···,
TITLE: E-BOOK B,
OWNER: pressR,
ISSUER: pressR,
PRICE: 800,

FIG. 11A

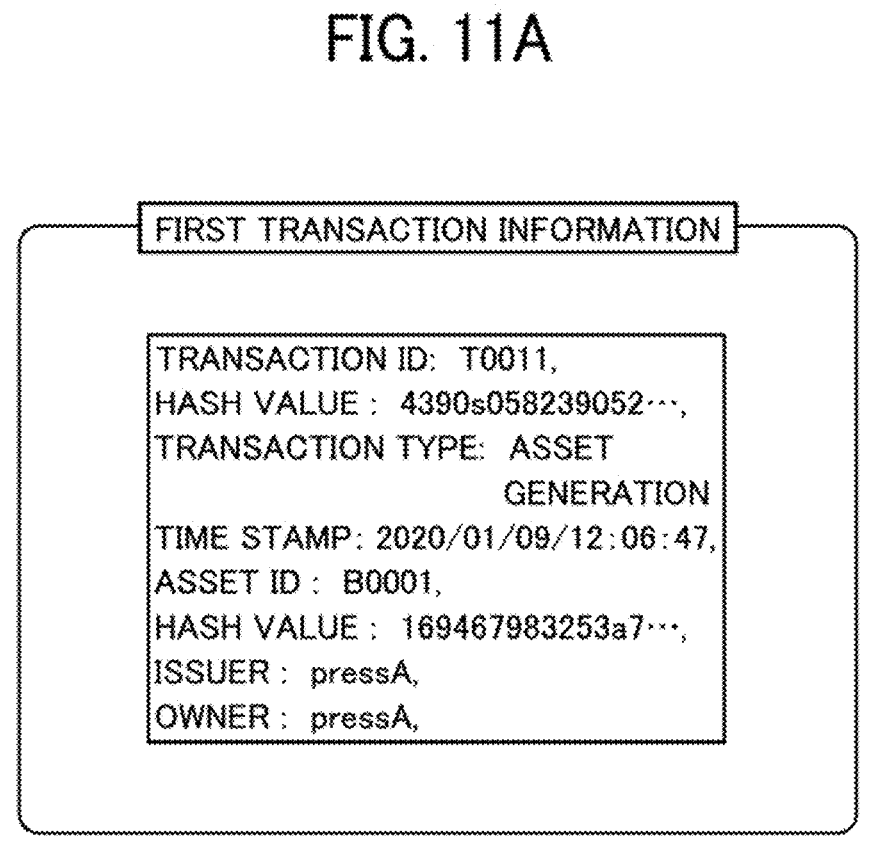

FIRST TRANSACTION INFORMATION

TRANSACTION ID: T0011,
HASH VALUE : 4390s058239052⋯,
TRANSACTION TYPE: ASSET
GENERATION
TIME STAMP: 2020/01/09/12:06:47,
ASSET ID : B0001,
HASH VALUE : 169467983253a7⋯,
ISSUER : pressA,
OWNER : pressA,

FIG. 11B

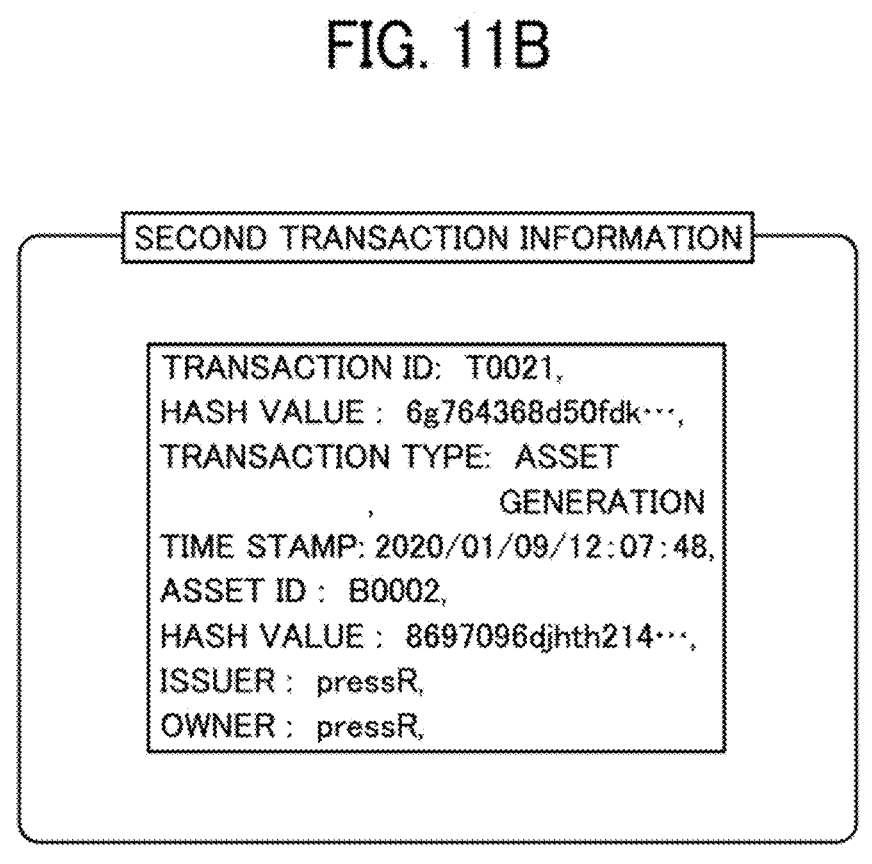

SECOND TRANSACTION INFORMATION

TRANSACTION ID:  T0021,
HASH VALUE :  6g764368d50fdk···,
TRANSACTION TYPE:  ASSET
                      ,           GENERATION
TIME STAMP: 2020/01/09/12:07:48,
ASSET ID :  B0002,
HASH VALUE :  8697096djhth214···,
ISSUER :  pressR,
OWNER :  pressR,

FIG. 12

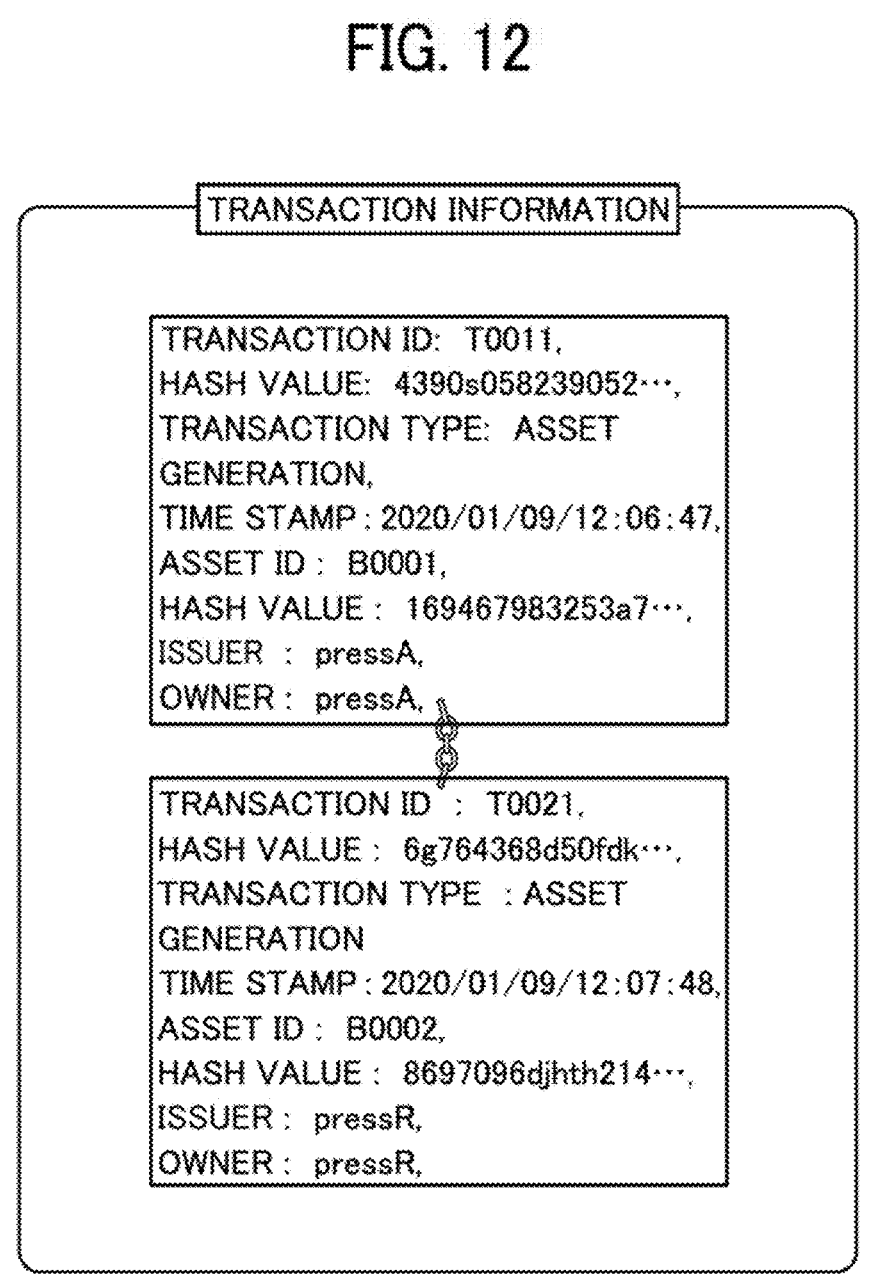

TRANSACTION INFORMATION

TRANSACTION ID:  T0011,
HASH VALUE:  4390s058239052···,
TRANSACTION TYPE:  ASSET
GENERATION,
TIME STAMP: 2020/01/09/12:06:47,
ASSET ID :  B0001,
HASH VALUE :  169467983253a7···,
ISSUER  :  pressA,
OWNER :  pressA, TRANSACTION ID  :  T0021,
HASH VALUE :  6g764368d50fdk···,
TRANSACTION TYPE  : ASSET
GENERATION
TIME STAMP : 2020/01/09/12:07:48,
ASSET ID :  B0002,
HASH VALUE :  8697096djhth214···,
ISSUER :  pressR,
OWNER :  pressR,

FIG. 17

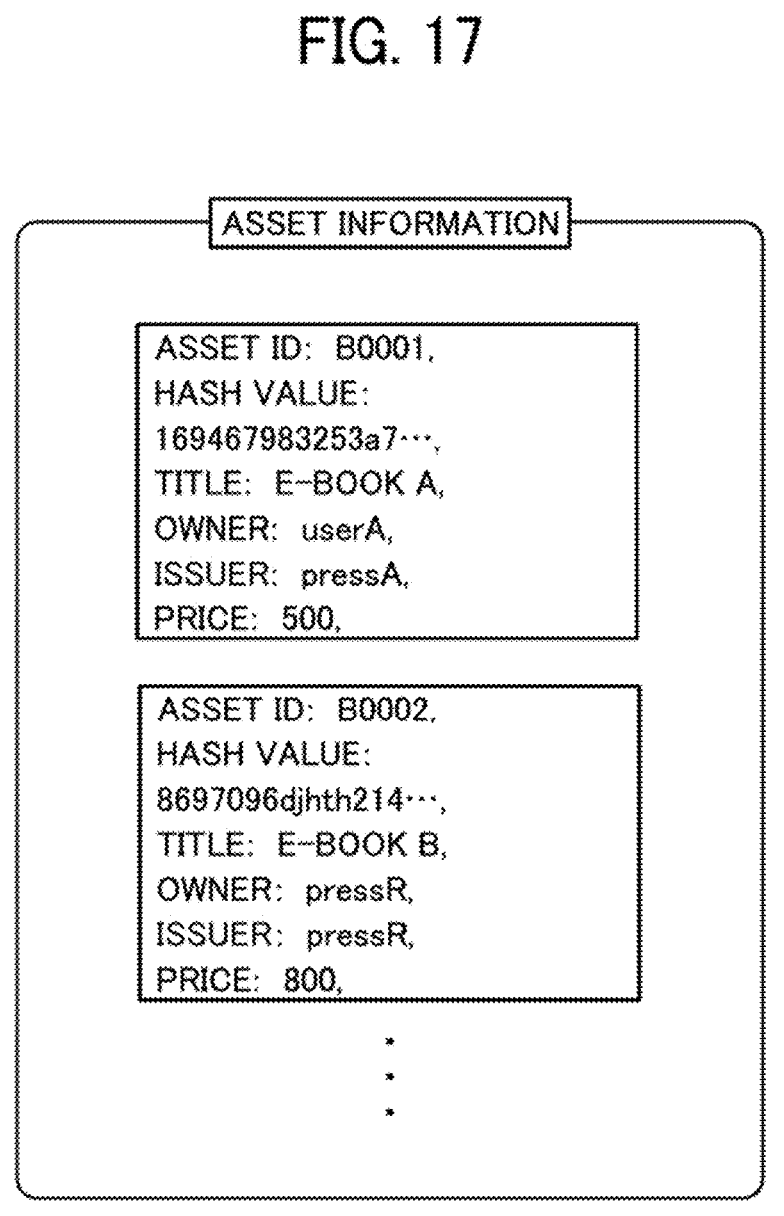

ASSET INFORMATION

ASSET ID: B0001,
HASH VALUE:
169467983253a7···,
TITLE: E-BOOK A,
OWNER: userA,
ISSUER: pressA,
PRICE: 500, ASSET ID: B0002,
HASH VALUE:
8697096djhth214···,
TITLE: E-BOOK B,
OWNER: pressR,
ISSUER: pressR,
PRICE: 800,

.
.
.

FIRST TRANSACTION INFORMATION

TRANSACTION ID: T0011,
HASH VALUE: 4390s058239052···,
TRANSACTION TYPE: ASSET GENERATION,
TIME STAMP: 2020/01/09/12:06:47,
ASSET ID: B0001,
HASH VALUE: 169467983253a7···,
ISSUER: pressA,
OWNER: pressA, TRANSACTION ID: T0012,
HASH VALUE: 862ywj8j98wqcn···,
TRANSACTION TYPE: ASSET ALLOCATION,
TIME STAMP: 2020/01/15/19:15:07,
ASSET ID: B0001,
HASH VALUE: 169467983253a7···,
NEW OWNER: user A,

FIG. 22

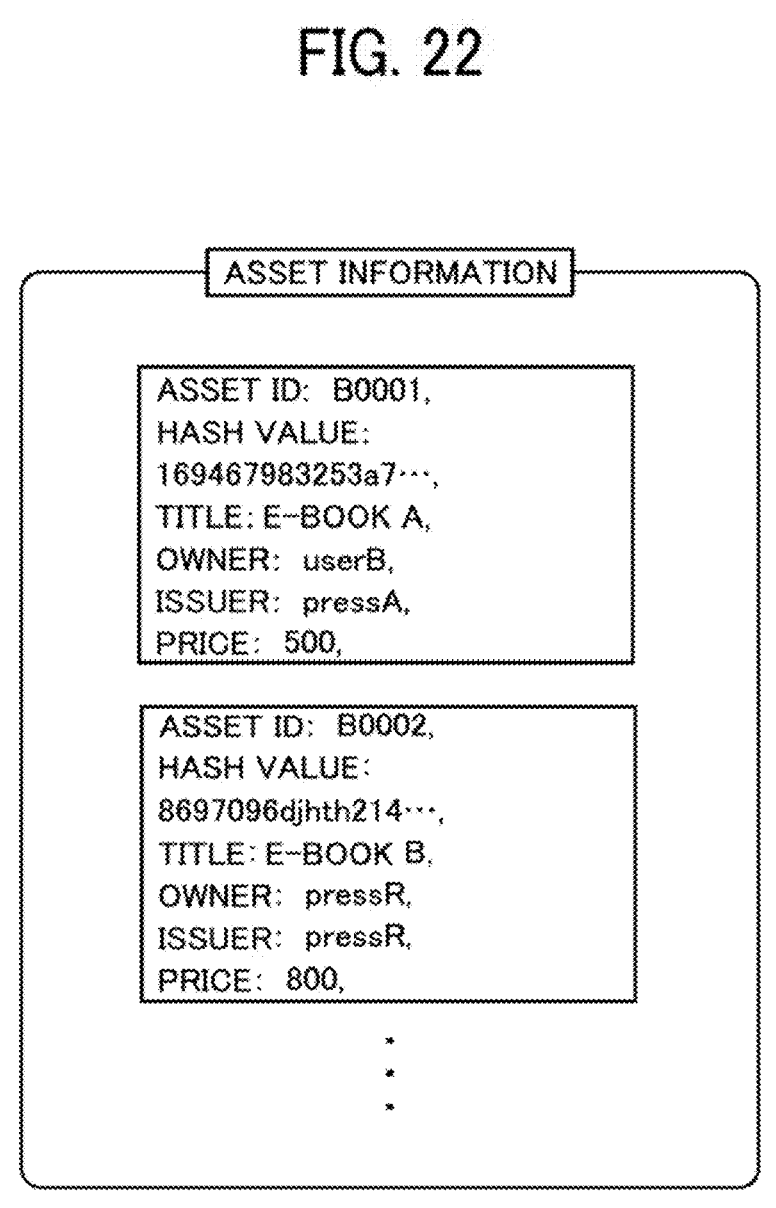

ASSET INFORMATION

ASSET ID: B0001,
HASH VALUE:
169467983253a7···,
TITLE: E-BOOK A,
OWNER: userB,
ISSUER: pressA,
PRICE: 500, ASSET ID: B0002,
HASH VALUE:
8697096djhth214···,
TITLE: E-BOOK B,
OWNER: pressR,
ISSUER: pressR,
PRICE: 800,

FIG. 23

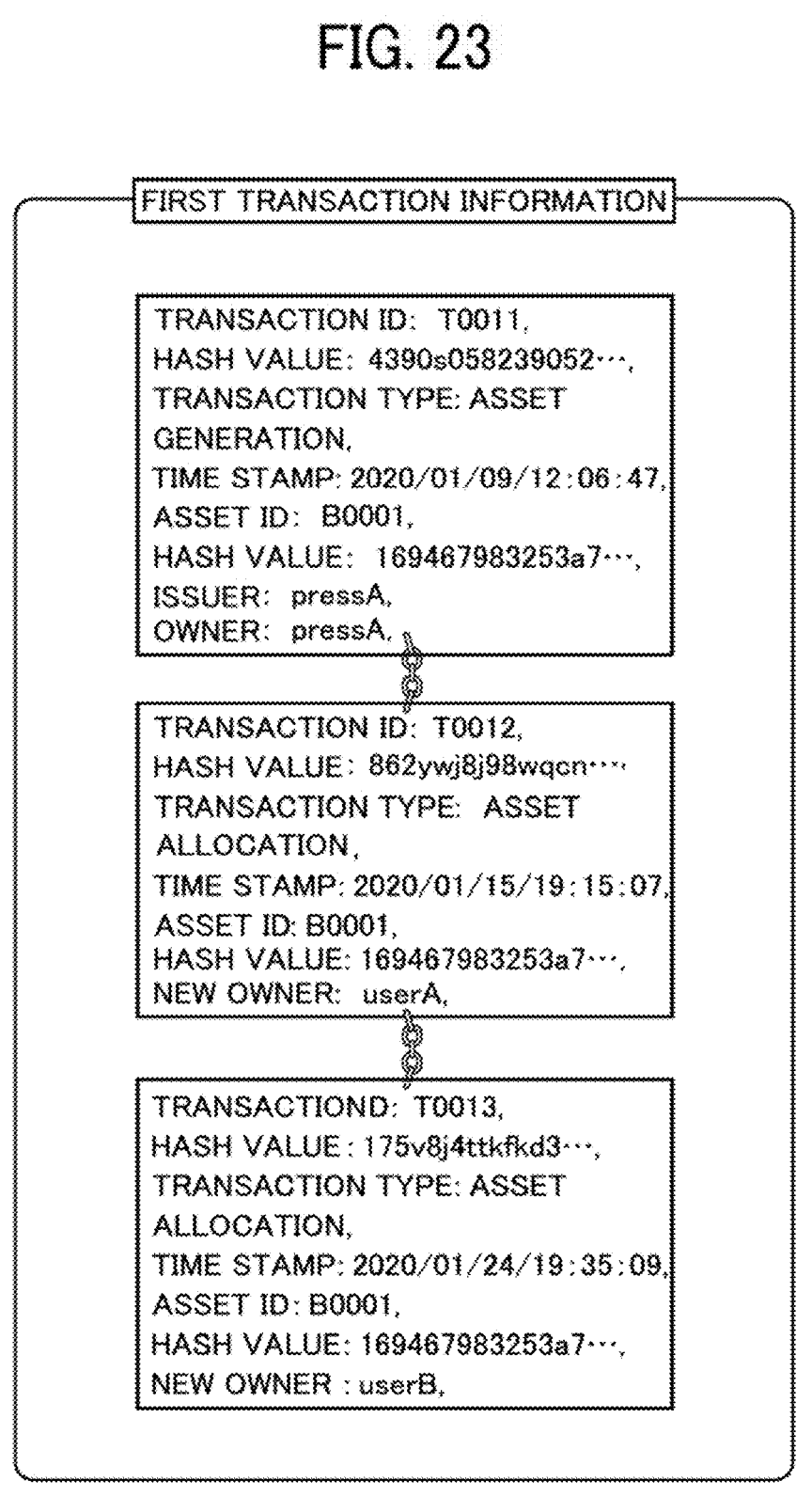

FIRST TRANSACTION INFORMATION

TRANSACTION ID: T0011,
HASH VALUE: 4390s058239052···,
TRANSACTION TYPE: ASSET
GENERATION,
TIME STAMP: 2020/01/09/12:06:47,
ASSET ID: B0001,
HASH VALUE: 169467983253a7···,
ISSUER: pressA,
OWNER: pressA, TRANSACTION ID: T0012,
HASH VALUE: 862ywj8j98wqcn····
TRANSACTION TYPE: ASSET
ALLOCATION,
TIME STAMP: 2020/01/15/19:15:07,
ASSET ID: B0001,
HASH VALUE: 169467983253a7···,
NEW OWNER: userA, TRANSACTIOND: T0013,
HASH VALUE: 175v8j4ttkfkd3···,
TRANSACTION TYPE: ASSET
ALLOCATION,
TIME STAMP: 2020/01/24/19:35:09,
ASSET ID: B0001,
HASH VALUE: 169467983253a7···,
NEW OWNER : userB,

FIG. 26

| USER | HASH VALUE | USE PERIOD |
|---|---|---|
| user A | 48678v9mtwppcq… | 2020/1/25/20:21:43 |
| — | 3tkdt9d390tdmw… | — |
| … | … | … |

FIG. 27

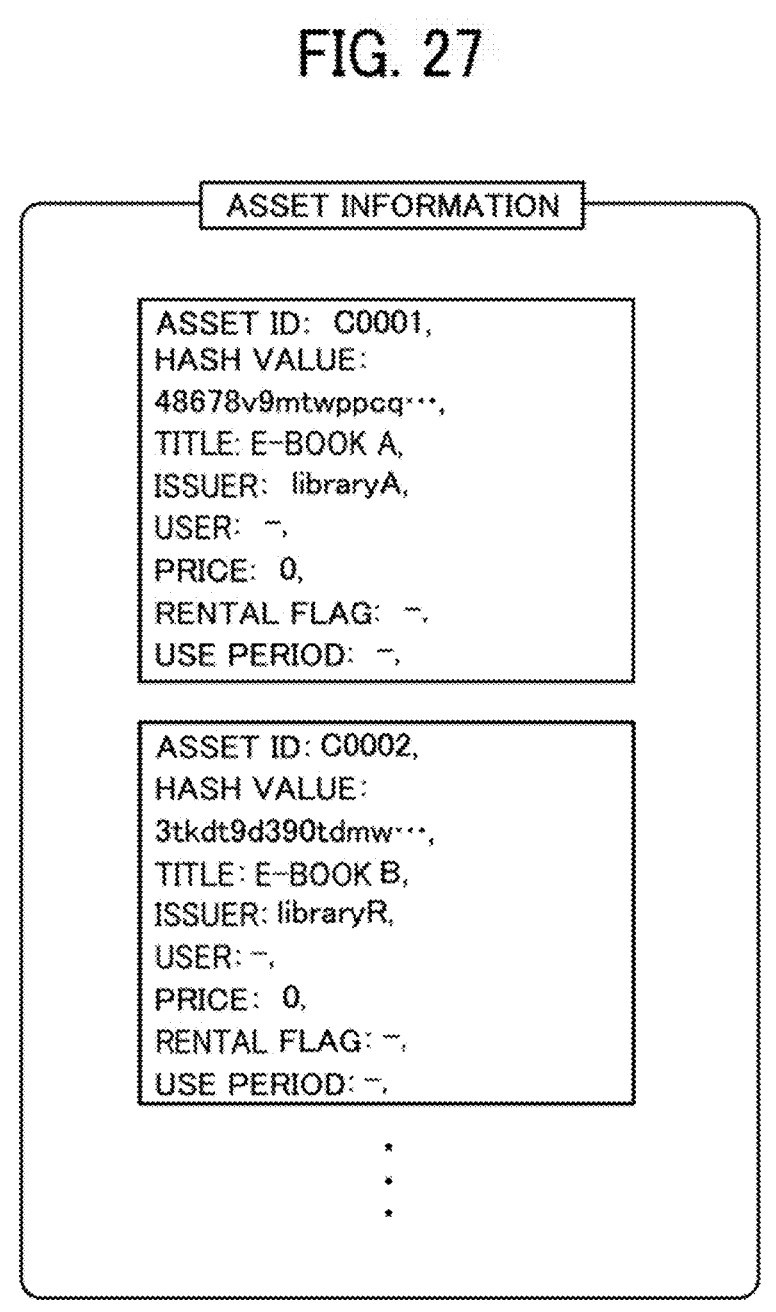

ASSET INFORMATION

ASSET ID: C0001,
HASH VALUE:
48678v9mtwppcq···,
TITLE: E-BOOK A,
ISSUER: libraryA,
USER: ¬,
PRICE: 0,
RENTAL FLAG: ¬,
USE PERIOD: ¬, ASSET ID: C0002,
HASH VALUE:
3tkdt9d390tdmw···,
TITLE: E-BOOK B,
ISSUER: libraryR,
USER: ¬,
PRICE: 0,
RENTAL FLAG: ¬,
USE PERIOD: ¬,

Figure 30:
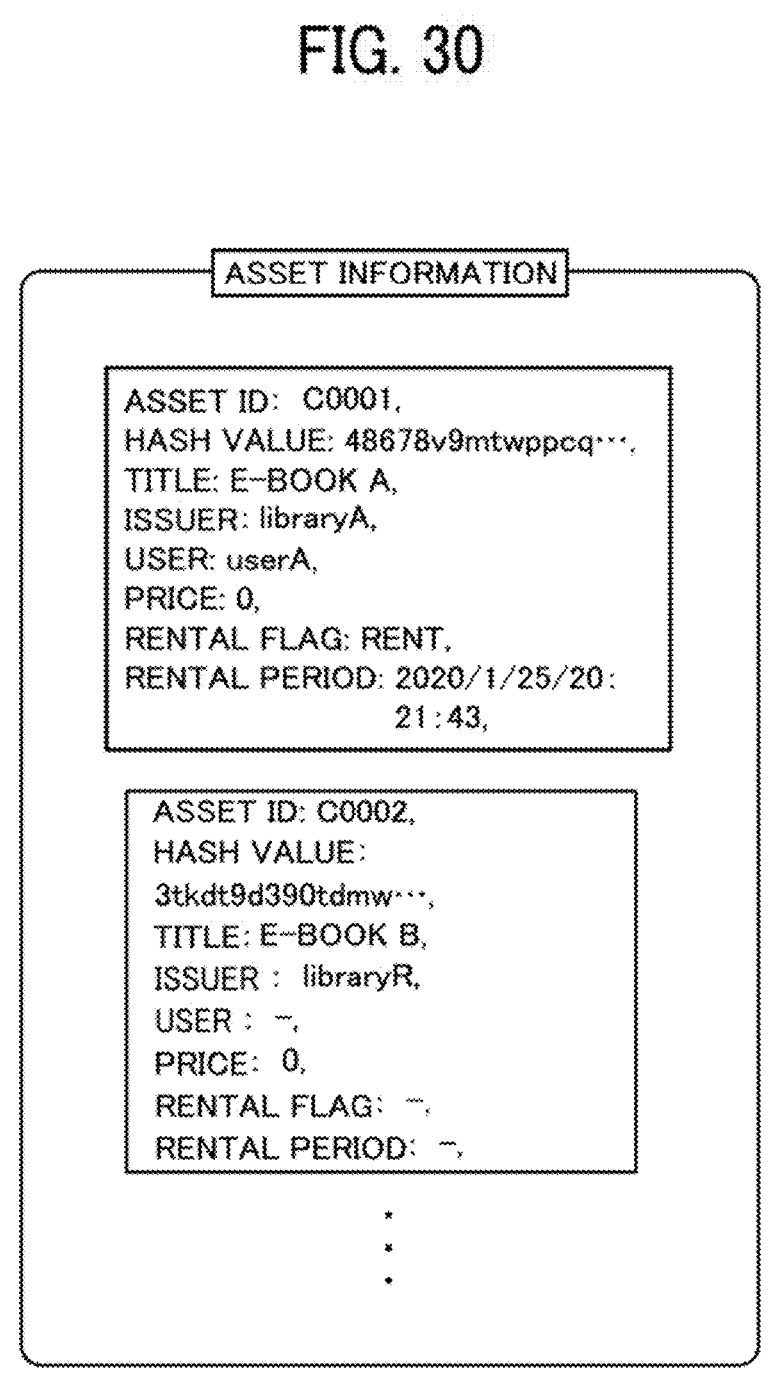

ASSET INFORMATION

ASSET ID: C0001,
HASH VALUE: 48678v9mtwppcq···,
TITLE: E-BOOK A,
ISSUER: libraryA,
USER: userA,
PRICE: 0,
RENTAL FLAG: RENT,
RENTAL PERIOD: 2020/1/25/20:
                        21:43, ASSET ID: C0002,
HASH VALUE:
3tkdt9d390tdmw···,
TITLE: E-BOOK B,
ISSUER : libraryR,
USER : ¬,
PRICE: 0,
RENTAL FLAG: ¬,
RENTAL PERIOD: ¬,

FIG. 31

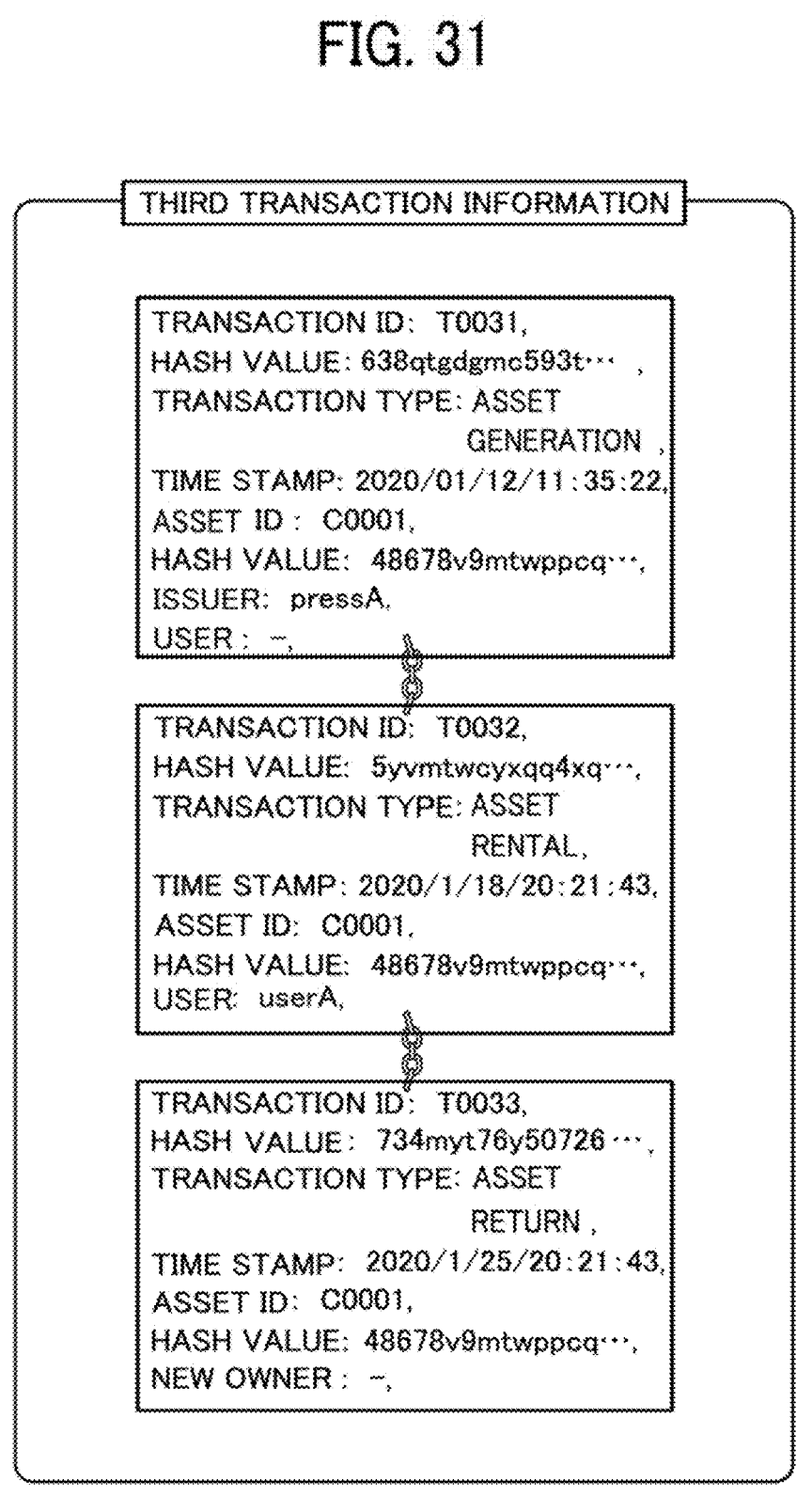

THIRD TRANSACTION INFORMATION

TRANSACTION ID: T0031,
HASH VALUE: 638qtgdgmc593t··· ,
TRANSACTION TYPE: ASSET
                   GENERATION ,
TIME STAMP: 2020/01/12/11:35:22,
ASSET ID: C0001,
HASH VALUE: 48678v9mtwppcq···,
ISSUER: pressA,
USER: -, TRANSACTION ID: T0032,
HASH VALUE: 5yvmtwcyxqq4xq···,
TRANSACTION TYPE: ASSET
                   RENTAL,
TIME STAMP: 2020/1/18/20:21:43,
ASSET ID: C0001,
HASH VALUE: 48678v9mtwppcq···,
USER: userA, TRANSACTION ID: T0033,
HASH VALUE: 734myt76y50726···,
TRANSACTION TYPE: ASSET
                   RETURN ,
TIME STAMP: 2020/1/25/20:21:43,
ASSET ID: C0001,
HASH VALUE: 48678v9mtwppcq···,
NEW OWNER: -,

APPARATUS AND METHOD FOR PROVIDING SERVICES WITH A BLOCKCHAIN SYSTEM

CROSS-REFERENCE TO RELATED APPLICATIONS

This patent application is a continuation application of International Application No. PCT/JP2021/008713, filed on Mar. 5, 2021, which claims priority to Japanese Patent Application Nos. 2020-047127, filed on Mar. 18, 2020, and 2021-029164, filed on Feb. 25, 2021, in the Japan Patent Office, the entire disclosure of which is hereby incorporated by reference herein.

BACKGROUND

Technical Field

This disclosure relates to an apparatus, system, and method of providing services.

Related Art

There are many services, which provide electronic data such as electronic books or audio data to users. For example, the known system allows the user to use certain electronic data, distributed from the service provider, based on completion of a transaction between the user and the service provider on a network.

SUMMARY

Example embodiments include an apparatus for providing services, includes: circuitry that: receive, from a communication terminal of a user, a request for obtaining a particular item of one or more items provided by one or more service providers, information on the one or more items being managed on a blockchain system; transmits, to the blockchain system, a request for changing information on a use right of the particular item to indicate transfer of the use right to the user; and provides the particular item to the communication terminal of the user having the use right of the particular item.

Example embodiments include a system for providing services, including: circuitry that: receives, from a communication terminal of a user, a request for obtaining a particular item of one or more items provided by one or more service providers, information on the one or more items being managed on a blockchain system; transmits, to the blockchain system, a request for changing information on a use right of the particular item to indicate transfer of the use right to the user; and provides the particular item to the communication terminal of the user having the use right of the particular item.

Example embodiments include a method of providing services, including: receiving, from a communication terminal of a user, a request for obtaining a particular item of one or more items provided by one or more service providers, information on the one or more items being managed on a blockchain system; transmitting, to the blockchain system, a request for changing information on a use right of the particular item to indicate transfer of the use right to the user; and providing the particular item to the communication terminal of the user having the use right of the particular item.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings.

FIG. 1 is a diagram illustrating an example configuration of a network system according to an embodiment.

FIG. 6A is a conceptual diagram illustrating an example of an authentication management table according to the first embodiment.

FIG. 6B is a conceptual diagram illustrating an example of an owner management table according to the first embodiment.

FIG. 7A is a conceptual diagram illustrating an example of a data management table according to the first embodiment.

FIG. 7B is a conceptual diagram illustrating an example of an owner management table according to the first embodiment.

FIG. 9 is a diagram illustrating an example of a data registration screen displayed at the service provider apparatus according to the first embodiment.

FIG. 10 is a conceptual diagram illustrating an example of asset information stored in a node according to the first embodiment.

FIG. 11A is a conceptual diagram illustrating an example of transaction information stored in a node according to the first embodiment.

FIG. 11B is a conceptual diagram illustrating an example of transaction information stored in a node according to the first embodiment.

FIG. 12 is a conceptual diagram illustrating another example of transaction information stored in a node according to the first embodiment.

FIG. 17 is a conceptual diagram illustrating an example of asset information updated at S47.

FIG. 22 is a conceptual diagram illustrating an example of asset information updated at S70.

FIG. 23 is a conceptual diagram illustrating an example of transaction information generated at S71.

FIG. 26 is a conceptual diagram illustrating an example of a user management table according to the second embodiment.

FIG. 27 is a conceptual diagram illustrating an example of asset information stored in a node according to the second embodiment.

FIG. 30 is a conceptual diagram illustrating an example of asset information updated at S118.

FIG. 31 is a conceptual diagram illustrating an example of transaction information generated at S119.

Figure 2:
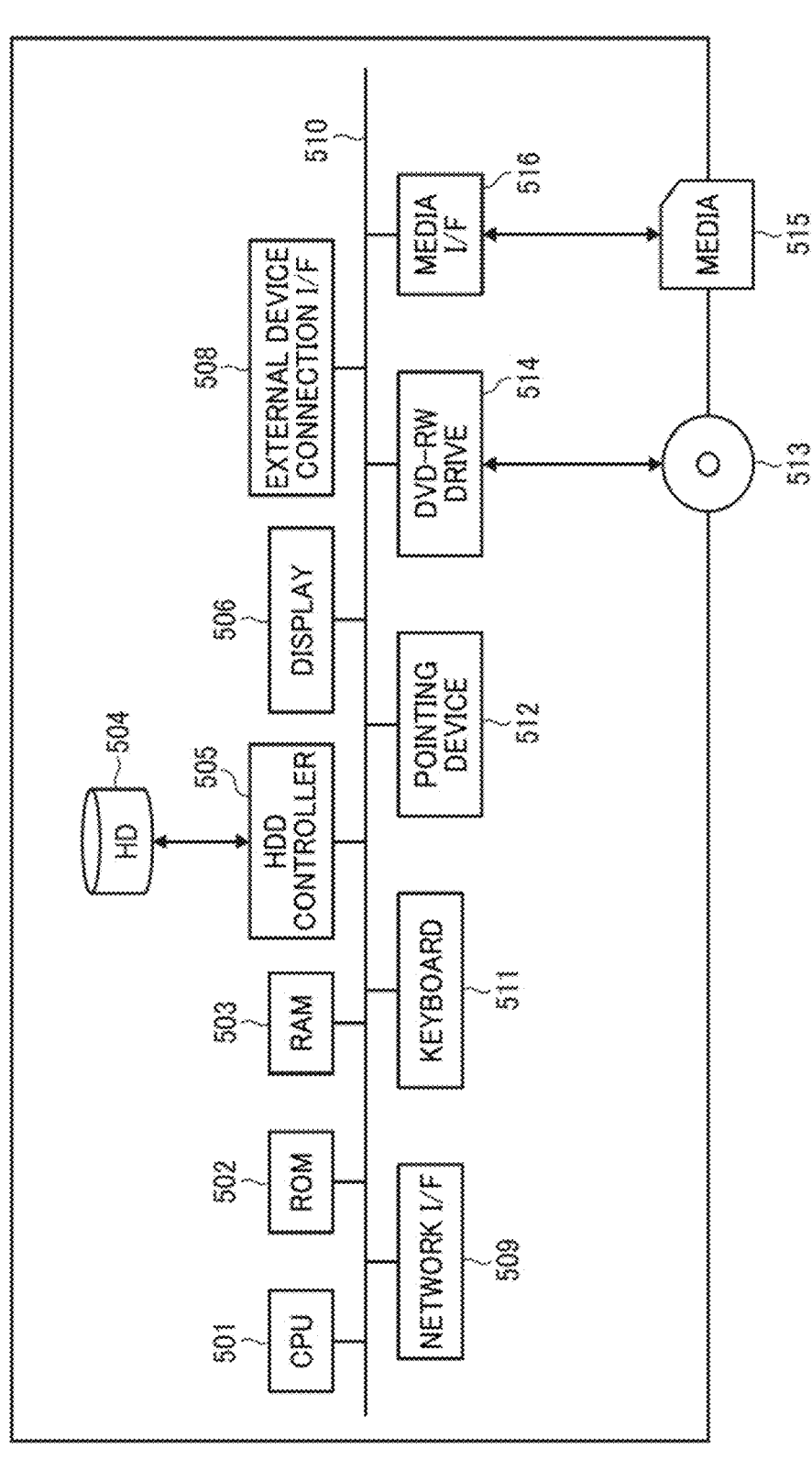
FIG. 2 is a diagram illustrating an example of a hardware configuration of the computer according to the embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, one or more embodiments of the present invention will be described with reference to the drawings. In the description of the drawings, the same elements are denoted by the same reference numerals, and redundant descriptions thereof are omitted.

System Configuration

FIG. 1 is a diagram illustrating an example configuration of a network system according to an embodiment. The network system 1 illustrated in FIG. 1 is a system that manages one or more items to be exchanged, which are provided by a plurality of service providers, using a blockchain, so as to facilitate exchange of items between the service providers and users.

In this disclosure, the item to be exchanged is any item, which can be provided from the service provider to the user as a result of transaction carried out between the service provider and the user. Thus, the item to be exchanged may be referred to as a transaction item.

The network system 1 includes a communication terminal 10, a service management apparatus 30, and a service provider system 7. The communication terminal 10, the service management apparatus 30, and the service provider system 7 are connected to each other via a communication network 5. The communication network 5 is implemented by a LAN (Local Area Network), a dedicated line, the Internet, a mobile communication network, etc. The communication network 5 may include not only wired communication, but also include wireless communication networks such as 5G (5th Generation), WiFi (Wireless Fidelity®), WiMAX (Worldwide Interoperability for Microwave Access), and LTE (Long Term Evolution).

The communication network 5 further includes a blockchain 8 including a plurality of nodes 80, which may be referred to as a blockchain system or a blockchain network. The node 80 is, for example, a smartphone, a tablet terminal, a mobile phone, or a PC (personal computer). The blockchain 8 utilizes a distributed ledger technology (distributed network) for enabling users to share information (ledger). The blockchain 8 makes transaction information open to the public, and allows all users to check legitimacy of the transaction information, to carry out transactions (contracts) without fraud. The blockchain 8 includes the plurality of nodes 80 each used by a particular user. The user operates his or her device to rewrite or check the information managed by the blockchain 8 at his or her node 80.

The communication terminal 10 may be a terminal device such as a smartphone used by a user. The communication terminal 10 communicates data with the service provider apparatus 70 by accessing the communication network 5 such as the Internet. The communication terminal 10 is not limited to a smartphone, and may be a tablet terminal, a mobile phone, a PC, etc.

The service management apparatus 30 is a server apparatus that manages services provided by a service provider via the communication terminal 10.

The service provider system 7 includes a plurality of service provider apparatuses 70 (the service provider apparatuses 70*a*, 70*b*, and 70*c*, hereinafter collectively referred to as the service provider apparatus 70 unless they need to be distinguished from each other). The service provider apparatus 70 is a server apparatus that provides one or more services to allow exchange of an item (referred to as an item to be exchanged, or a transaction item) having the ownership issued by the service provider, between different users. For example, the services provided by the service provider include: a browsing service of an electronic book; a service of distributing a video image, a still image such as a photograph or a painting, music, voice, or the like; a document issuing service of a contract document or an official document; and an electric power exchange service in a power retail business. Examples of the item to be exchanged include electronic data such as an electronic book, video image data, still image data, music data, voice data, or document data.

The number of service provider apparatuses 70 included in the service provider system 7 is not limited to three, as illustrated in FIG. 1. The service management apparatus 30 and the service provider apparatus 70 may each be implemented by a plurality of computers that together carry out its functions that are distributed over the computers. Further, the service management apparatus 30 and the service provider apparatus 70 may each be implemented as a server computer residing on a cloud network, or may be a server residing on an on-premise network.

Hardware Configuration

Next, referring to FIG. 2, a hardware configuration of each device of the network system 1 is described according to an embodiment. Any Component may be added to or removed from the hardware configuration illustrated in FIG. 2 as needed. The devices on the network system 1 each have a configuration as a general-purpose computer. In the following, an example of a hardware configuration of the general-purpose computer is described.

FIG. 2 is a diagram illustrating an example of a hardware configuration of the computer according to the embodiment. The computer includes a central processing unit (CPU) 501, a read only memory (ROM) 502, a random access memory (RAM) 503, a hard disk (HD) 504, a hard disk drive (HDD) controller 505, a display 506, an external device connection interface (I/F) 508, a network I/F 509, a bus line 510, a keyboard 511, a pointing device 512, a digital versatile disk rewritable (DVD-RW) drive 514, and a media (medium) I/F 516.

The CPU 501 controls entire operation of the computer. The ROM 502 stores a program for controlling the CPU 501, such as an initial program loader (IPL). The RAM 503 is used as a work area for the CPU 501. The HD 504 stores various data such as the program. The HDD controller 505 controls reading or writing of various data with respect to the HD 504 under control of the CPU 501. The display 506 displays various information such as cursors, menus, windows, characters, or images. The external device connection I/F 508 is an interface that connects to various external devices. Examples of the external devices include, but not limited to, a universal serial bus (USB) memory and a printer. The network I/F 509 is an interface that controls communication of data through the communication network 5. The bus line 510 is an address bus, a data bus or the like, which electrically connects the elements illustrated in FIG. 2 such as the CPU 501.

The keyboard 511 is an example of an input device including a plurality of keys for inputting characters, numerical values, various instructions, and the like. The pointing device 512 is another example of an input device that allows a user to select or execute a specific instruction, select a target for processing, or move a cursor being displayed. The DVD-RW drive 514 reads and writes various data from and to a DVD-RW 513, which is an example of a removable recording media (medium). In alternative to the DVD-RW, any recording medium may be used such as a DVD-R, Blu-ray Disc (Registered Trademark), etc. The media I/F 516 controls reading and writing (storing) of data from and to a recording media (medium) 515 such as a flash memory.

Any of the above-described programs may be stored in a computer-readable recording medium as a file in an installable format or an executable format for distribution. Examples of the recording medium include a compact disc recordable (CD-R), a digital versatile disk (DVD), a Blu-ray Disc, an SD card, and a USB memory. In addition, such recording medium may be provided in the form of a program product to users within a certain country or outside that country. For example, the service provider apparatus 70 according to the embodiment executes the program, according to the embodiment, to implement a method for providing services.

Software Configuration

Figure 3:
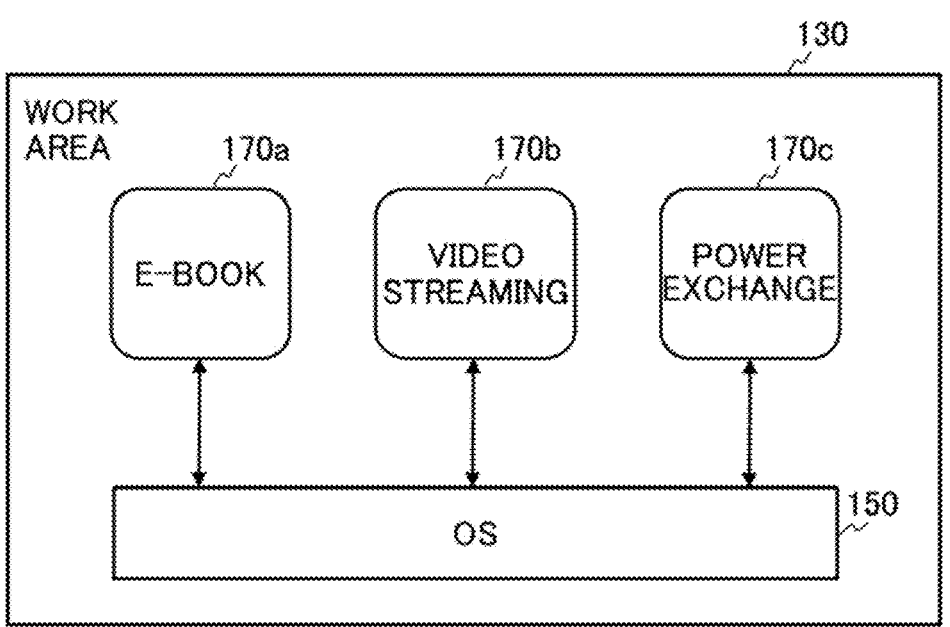
FIG. 3 is a diagram illustrating an example of a software configuration of the communication terminal according to the embodiment.

Referring next to FIG. 3, computer software installed in the communication terminal 10 is described according to the embodiment. FIG. 3 is a diagram illustrating an example of a software configuration of the communication terminal according to the embodiment. As illustrated in FIG. 3, an OS (Operating System) 150, electronic book (e-book) application 170a, video streaming application 170b, and power exchange application 170c operate in a work area 130 of the RAM 503. The OS 150 is basic software that provides basic functions of the communication terminal 10 and controls the entire communication terminal 10.

The e-book application 170a, the video streaming application 170b, and the power exchange application 170c are each application that operates on the OS 150. The e-book application 170a, the video streaming application 170b, and the power exchange application 170c, execute processing independently of each other, to request the service provider apparatus 70 to provide services or functions. The e-book application 170a is an application for allowing browsing of e-books distributed from the service provider apparatus 70. The video streaming application 170b is an application for allowing viewing of video or audio distributed from the service provider apparatus 70. The power exchange application 170c is an application for controlling exchange of electric power with such as a power retailer. FIG. 3 illustrates an example in which three applications are installed in the communication terminal 10, but the number or types of applications installed in the communication terminal 10 are not limited to the example illustrated in FIG. 3.

First Embodiment

Overview

Figure 4:
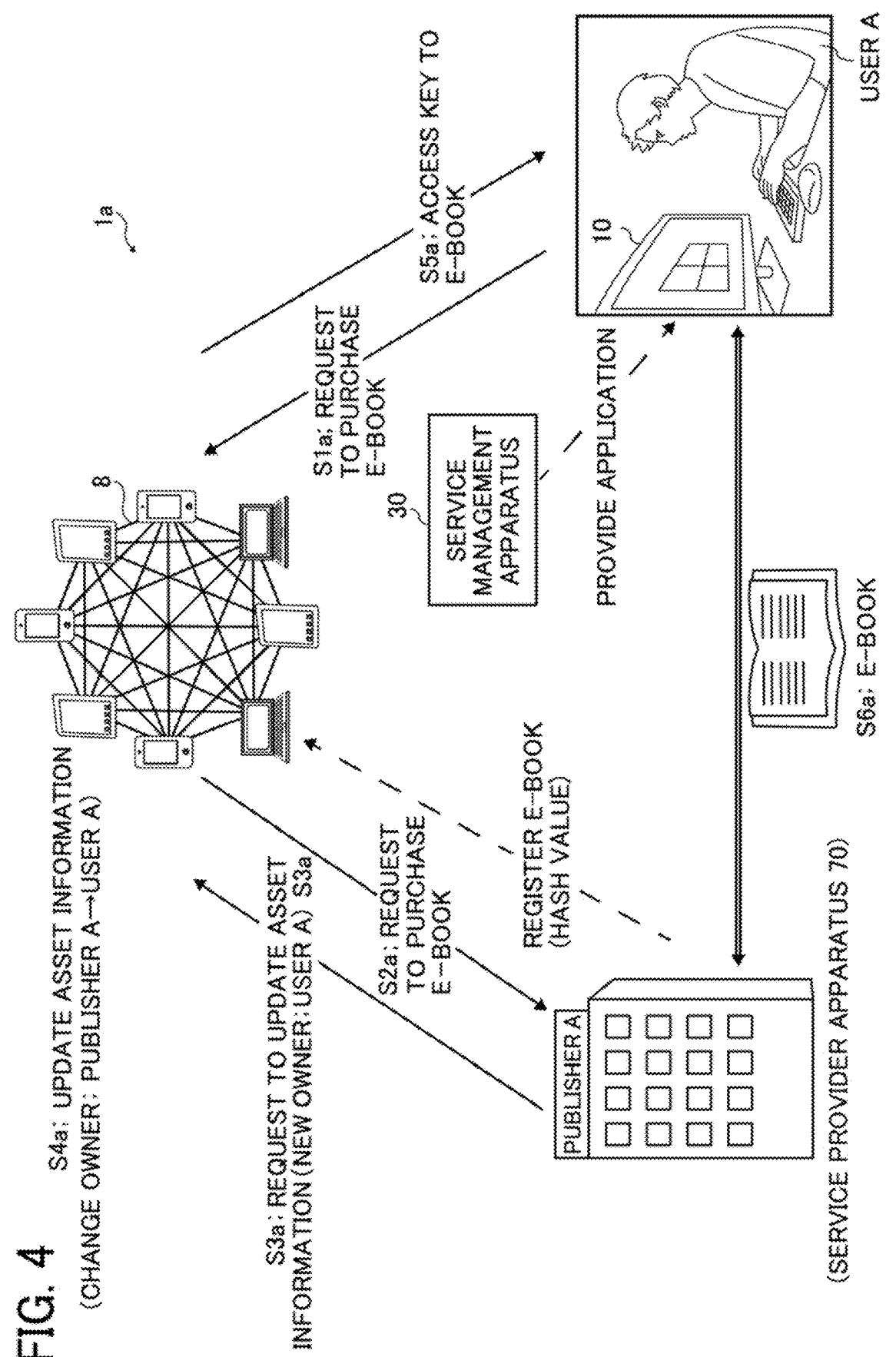
FIG. 4 is a diagram illustrating an example of an outline of processing performed by the network system according to a first embodiment.

Referring next to FIG. 4, an outline of processing performed by the network system is described according to the first embodiment. FIG. 4 schematically illustrates the network system according to the first embodiment, and detailed functions of the network system 1 are described with reference to drawings to be described later.

FIG. 4 is a diagram illustrating an example of an outline of processing performed by the network system according to the first embodiment. FIG. 4 illustrates an example in which a user A purchases an e-book, which is an example of an item to be exchanged, from a publisher A.

The service provider apparatus 70 of the publisher A registers information on one or more e-books to be exchanged with the user in the blockchain 8 in advance. At this time, the service provider apparatus 70 does not register data of the e-book in the blockchain 8, but registers a hash value uniquely assigned to the e-book. The hash value is a unique value for identifying the e-book, and it is not possible to back calculate what the original data indicates from the hash value. On the blockchain 8, information on e-books to be exchanged, which is transmitted from the plurality of service provider apparatuses 70, is registered as asset information.

The communication terminal 10 of the user A transmits a purchase request for an e-book to the blockchain 8 by using the e-book application 170*a* (see FIG. 3) provided from the service management apparatus 30 (S1*a*). Next, the blockchain 8 transmits the purchase request transmitted from the communication terminal 10 to the service provider apparatus 70 of the publisher A that has issued the e-book to be purchased (S2*a*).

Next, the service provider apparatus 70 transmits an update request for updating the asset information to the blockchain 8 (S3*a*). Then, the blockchain 8 updates the information on the owner of the e-book to be purchased, from among the registered asset information that is managed (S4*a*). In this way, the owner of the e-book issued by the publisher A is changed from the publisher A to the user A. The blockchain 8 transmits an access key of the requested e-book to the communication terminal 10 as a request source (S5*a*).

Then, the user A at the communication terminal 10 can browse the purchased e-book by accessing the service provider apparatus 70 of the publisher A using the access key transmitted from the blockchain 8 (S6*a*).

In this disclosure, DRM (Digital Rights Management) is used as an illegal copy prevention measure for copyright protection of copyrighted materials such as electronic books, video data, still image data, music data, voice data, and document data. DRM provides functions such as prevention of illegal copying of data and restriction to the number of times copying is allowed. DRM enables providers of copyrighted materials such as authors, publishers, and libraries to provide copyrighted data to users. On the other hand, since services utilizing DRM use a dedicated system specific to each service provider, it becomes costly to develop, operate, or manage such services. Further, since the services utilizing DRM manage the copyright for each service independently from other services, it has been difficult to transfer data to another service or transfer data to the third party. For example, the user is required to specify a specific provider from which an e-book is to be purchased. It has been inconvenient for the user, since registration processing for the user, an application to be used, or a fee system differs between different services or service providers.

In view of the above, the network system 1*a* illustrated in FIG. 4 transfers ownership of the item (for example, an e-book), which is a right to use the item, and managed on the blockchain 8. This can improve the fault tolerance of the system, and guarantee the tamper resistance, as it would be difficult to tamper with the contents written in the blockchain 8. Thus, the network system 1 can improve the user operability in exchange of the item between the service provider and the user.

Functional Configuration

Figure 5:
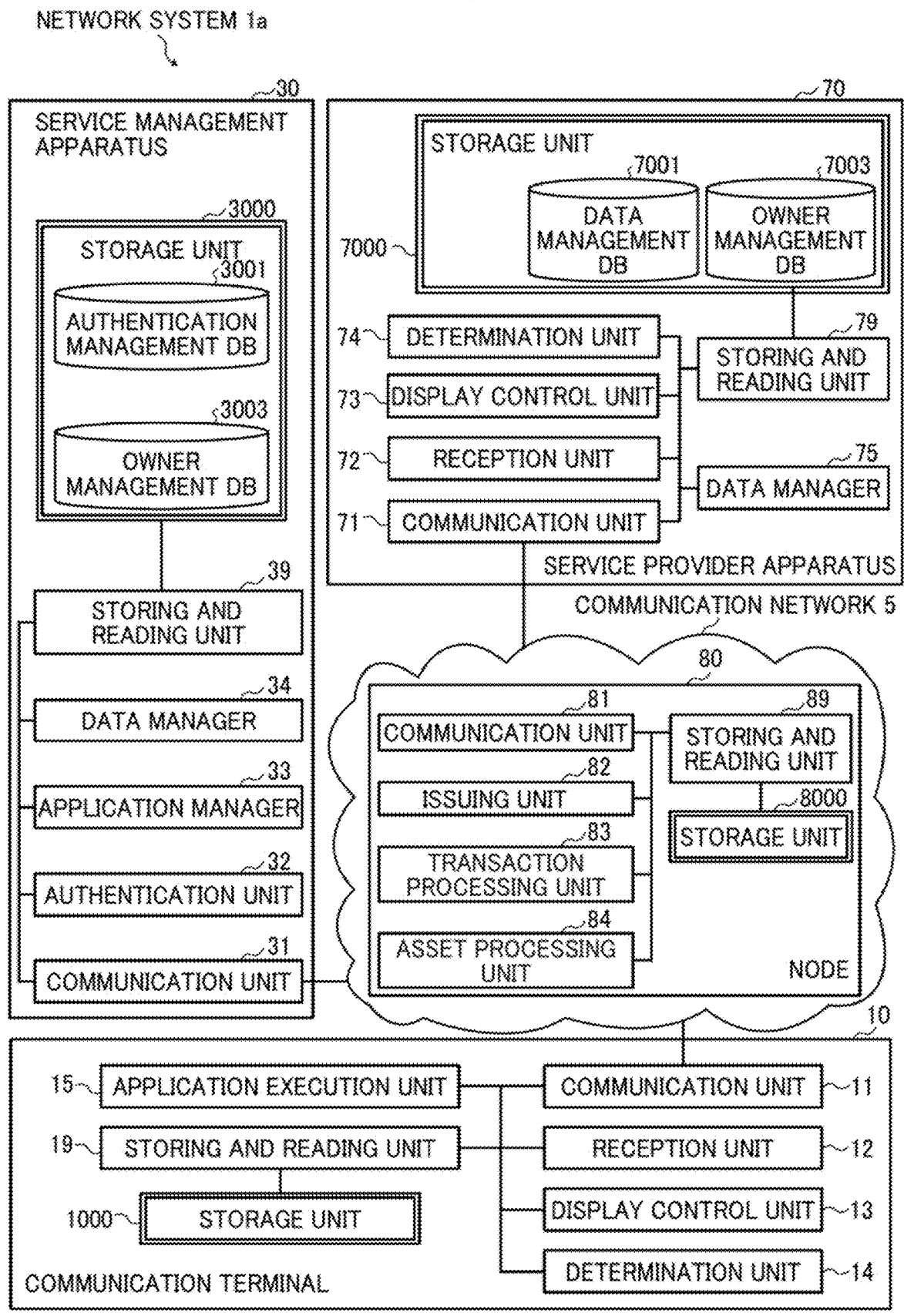
FIG. 5 is a diagram illustrating an example of a functional configuration of the network system according to the first embodiment.

Referring next to FIG. 5, a functional configuration of the network system is described according to the first embodiment. FIG. 5 is a diagram illustrating an example of a functional configuration of the network system according to the first embodiment. FIG. 5 illustrates a part of the terminals or devices of FIG. 1, which are related to processes or operations described later.

Functional Configuration of Communication Terminal

Referring to FIG. 5, a functional configuration of the communication terminal 10 is described according to the embodiment. The communication terminal 10 includes a communication unit 11, a reception unit 12, a display control unit 13, a determination unit 14, an application execution unit 15, and a storing and reading unit 19. These units are functions that are implemented by, or means for achieving such functions, by any of the components illustrated in FIG. 2 that operate under instructions by the CPU 501 according to a program expanded from the ROM 502 onto the RAM 503. The communication terminal 10 further includes a storage unit 1000 implemented by the ROM 502 and HD 504 illustrated in FIG. 2.

The communication unit 11, which is implemented by the network I/F 509 that operates according to instructions of the CPU 501, communicates various data or information with other device or terminal through the communication network 5. For example, the communication unit 11 transmits a request for exchanging an item, which is provided by the service provider, to the service provider apparatus 70. The communication unit 11 further receives, for example, electronic data related to the item to be exchanged, which is transmitted from the service provider apparatus 70.

The reception unit 12, which is implemented by the keyboard 511 or the pointing device 512 that operates according to instructions of the CPU 501, receives various selections or inputs from the user. The display control unit 13, which is mainly implemented by the instructions of the CPU 501, controls the display 506 to display various images. The determination unit 14, which is implemented by the instructions of the CPU 501, makes various determinations.

The application execution unit 15, which is implemented by the instructions of the CPU 501, executes application installed on the communication terminal 10. For example, at the communication terminal 10, the application execution unit 15 executes particular application illustrated in FIG. 3 to receive the item to be exchanged, which is provided by the service provider.

The storing and reading unit 19, which is mainly implemented by the instructions of the CPU 501, stores various data (or information) in the storage unit 1000 and reads various data (or information) from the storage unit 1000.

Functional Configuration of Service Management Apparatus

Next, referring to FIG. 5, a functional configuration of the service management apparatus 30 is described according to the embodiment. The service management apparatus 30 includes a communication unit 31, an authentication unit 32, an application manager 33, a data manager 34, and a storing and reading unit 39. These units are functions that are implemented by, or means for achieving such functions, by any of the components illustrated in FIG. 2 that operate under instructions by the CPU 501 according to a program expanded from the ROM 502 onto the RAM 503. The service management apparatus 30 further includes a storage unit 3000 implemented by the ROM 502 and HD 504 illustrated in FIG. 2.

The communication unit 31, which is implemented by the network I/F 509 that operates according to instructions of the CPU 501, communicates various data or information with other device or terminal through the communication network 5. The communication unit 31 receives, for example, login request information transmitted from the communication terminal 10.

The authentication unit 32, which is implemented by the instructions of the CPU 501, executes processing to authenticate a user as a request source based on a login request received by the communication unit 31. For example, the authentication unit 32 searches an authentication management DB 3001 using a user ID and a password included in the login request received by the communication unit 31 as search keys. The authentication unit 32 then performs user authentication by determining whether the same pair of user ID and password is stored in the authentication management DB 3001.

The application manager 33, which is mainly implemented by the instructions of the CPU 501, manages applications used by the network system 1. The data manager 34, which is mainly implemented by the instructions of the CPU 501, manages data related to the item to be exchanged, which is registered in the blockchain 8.

The storing and reading unit 39, which is mainly implemented by the instructions of the CPU 501, stores various data (or information) in the storage unit 3000 and reads various data (or information) from the storage unit 3000.

Authentication Management Table

FIG. 6A is a conceptual diagram illustrating an example of an authentication management table according to the first embodiment. The storage unit 3000 stores an authentication management database (DB) 3001, which is implemented by the authentication management table as illustrated in FIG. 6A. The authentication management table stores a user ID and a password in association, for each user who uses an application provided by the service management apparatus 30. The user ID is user identification information uniquely assigned to each user, such as a UUID (universally unique identifier) or a GUID (globally unique identifier). The authentication management table illustrated in FIG. 6A indicates that the user A has a user ID "user A" and a password "abab".

Owner Management Table

FIG. 6B is a conceptual diagram illustrating an example of an owner management table according to the first embodiment. The storage unit 3000 stores an owner management DB 3003 implemented by an owner management table as illustrated in FIG. 6B. The owner management table stores data including information on the owner of the item to be exchanged, which is registered in the blockchain 8. The owner management table stores an owner ID for identifying an owner of the item to be exchanged, a name of the item to be exchanged (in this example, a title of e-book), a hash value uniquely assigned to the item to be exchanged, an access key for accessing electronic data as the item to be exchanged, and provider information indicating a destination of a service provider, in association with one another.

Functional Configuration of Service Provider Apparatus

Next, referring to FIG. 5, a functional configuration of the service provider apparatus 70 is described according to the embodiment. The service provider apparatus 70 includes a communication unit 71, a reception unit 72, a display control unit 73, a determination unit 74, a data manager 75, and a storing and reading unit 79. These units are functions that are implemented by, or means for achieving such functions, by any of the components illustrated in FIG. 2 that operate under instructions by the CPU 501 according to a program expanded from the ROM 502 onto the RAM 503. The service provider apparatus 70 further includes a storage unit 7000 implemented by the ROM 502 and HD 504 illustrated in FIG. 2.

The communication unit 71, which is implemented by the network I/F 509 that operates according to instructions of the CPU 501, communicates various data or information with other device or terminal through the communication network 5. For example, the communication unit 71 receives a request for exchanging a particular item to be exchanged, from the communication terminal 10. The communication unit 71 further transmits a request for changing the use right of the particular item to be exchanged, to the blockchain 8.

Further, the communication unit 71 provides the particular item to be exchanged to the communication terminal 10 having the use right that is changed according to the change request transmitted to the blockchain 8.

The reception unit 72, which is implemented by the keyboard 511 or the pointing device 512 that operates according to instructions of the CPU 501, receives various selections or inputs from the user. The display control unit 73, which is mainly implemented by the instructions of the CPU 501, controls the display 506 to display various images. The determination unit 74, which is implemented by the instructions of the CPU 501, makes various determinations.

The data manager 75, which is mainly implemented by the instructions of the CPU 501, manages data related to the item to be exchanged, which is registered in the blockchain 8.

The storing and reading unit 79, which is mainly implemented by the instructions of the CPU 501, stores various data (or information) in the storage unit 7000 and reads various data (or information) from the storage unit 7000.

Data Management Table

FIG. 7A is a conceptual diagram illustrating an example of a data management table according to the first embodiment. The storage unit 7000 stores a data management DB 7001 implemented by a data management table as illustrated in FIG. 7A. The data management table stores information on electronic data as an item to be exchanged with a user. Specifically, the data management table stores a name of the item (in this example, a title of e-book) to be exchanged and provided to the user, a file name of electronic data as the item to be exchanged, a hash value uniquely assigned to the electronic data, and an access key for accessing the electronic data, in association with one another. The file name is an example of property data of the electronic data.

Owner Management Table

FIG. 7B is a conceptual diagram illustrating an example of an owner management table according to the first embodiment. The storage unit 7000 stores an owner management DB 7003 implemented by an owner management table as illustrated in FIG. 7B. The owner management table stores data including information on the owner of the item to be exchanged, which is registered in the blockchain 8. The owner management table stores, for each of one or more items, an owner ID for identifying an owner of an item to be exchanged, and a hash value uniquely assigned to the item to be exchanged, in association with each other.

Functional Configuration of Node

Next, referring to FIG. 5, a functional configuration of the node 80 implementing the blockchain 8 is described. It is assumed that the plurality of nodes 80 of the blockchain 8 each have the same function. The node 80 includes a communication unit 81, an issuing unit 82, a transaction processing unit 83, an asset processing unit 84, and a storing and reading unit 89. These units are functions that are implemented by, or means for achieving such functions, by any of the components illustrated in FIG. 2 that operate under instructions by the CPU 501 according to a program expanded from the ROM 502 onto the RAM 503. The node 80 further includes a storage unit 8000 implemented by the ROM 502 and the HD 504 illustrated in FIG. 2.

The communication unit 81, which is implemented by the network I/F 509 that operates according to instructions of the CPU 501, transmits or receives various data or information to or from other device or terminal through the communication network 5. The communication unit 81 receives, for example, registration request information transmitted from the service provider apparatus 70.

The issuing unit 82, which is mainly implemented by the instructions of the CPU 501, issues an access key for accessing electronic data.

The transaction processing unit 83, which is implemented by the instructions of the CPU 501, performs processing such as generating transaction information causing generation of asset information and storing the transaction information in the storage unit 8000. The transaction information is information in which a transaction history of an item to be exchanged, managed at the blockchain 8, is continuously stored. The asset processing unit 84, which is implemented by the instructions of the CPU 501, performs processing such as generating asset information according to the transaction information and storing the asset information in the storage unit 8000. Details of the transaction information and the asset information will be described later.

The storing and reading unit 89, which is mainly implemented by the instructions of the CPU 501, stores various data (or information) in the storage unit 8000 and reads various data (or information) from the storage unit 8000.
Processes and Operations of First Embodiment
Registration of Electronic Data Next, referring to FIGS. 8 to 24, processes or operation of the network system according to the first embodiment are described. In the following description, an example in which processing is performed with one node 80 of the blockchain 8 is described. However, the service provider apparatus 70 and the communication terminal 10 may be configured to perform processing with any node 80 of the blockchain 8.

Figure 8:
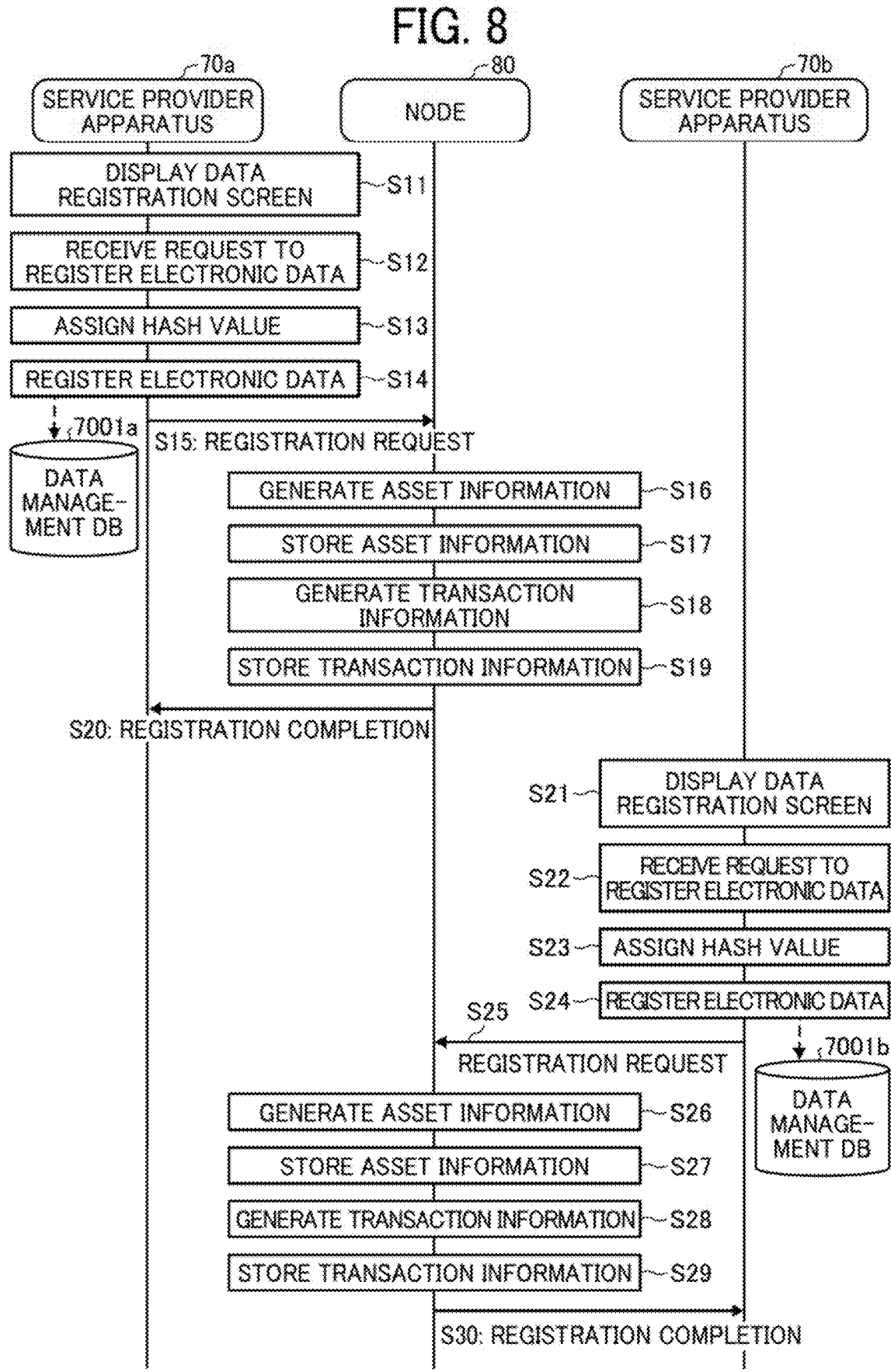
FIG. 8 is a sequence diagram illustrating an example of processing to register electronic data provided from the service provider apparatus in the network system according to the first embodiment.

First, referring to FIGS. 8 to 12, example processing of registering electronic data in the blockchain 8 is described. The electronic data is an item to be exchanged, provided from the service provider apparatus 70. FIG. 8 is a sequence diagram illustrating an example of processing to register electronic data provided from the service provider apparatus in the network system according to the first embodiment. FIG. 9 is a diagram illustrating an example of a data registration screen displayed at the service provider apparatus according to the first embodiment.

In response to reception of predetermined operation by the service provider, the display control unit 73*a* of the service provider apparatus 70*a* causes the display 506 to display a data registration screen 700 illustrated in FIG. 9 (S11). The data registration screen 700 illustrated in FIG. 9 is a display screen for allowing registration of electronic data to be provided to the user. The data registration screen 700 includes a data selection area 705 for selecting electronic data to be registered, a data display area 707 displaying information on the electronic data to be registered, a "register" button 708 to be pressed to register the electronic data, and a "cancel" button 709 to be pressed to cancel the registration processing.

Next, the reception unit 72*a* of the service provider apparatus 70*a* receives an electronic data registration request, when the service provider selects electronic data to be registered and presses the "register" button 708 (S12). In response to reception of registration of the electronic data by the reception unit 72*a*, the data manager 75*a* of the service provider apparatus 70*a* assigns a hash value corresponding to the electronic data to be registered (S13). Then, the data manager 75*a* of the service provider apparatus 70*a* stores, in the data management DB 7001*a* (see FIG. 7A), information on a data file of the electronic data corresponding to the registration request received at S12 and the hash value assigned at S13 in association with each other (S14). In this case, the data manager 75*a* stores a name (title) of the electronic data input to the data selection area 705 and the hash value in association with the data file of the electronic data.

Next, the communication unit 71*a* of the service provider apparatus 70*a* transmits, to the node 80, registration request information indicating a request for registering the unique data related to the data file registered in the data management DB 7001*a* (S15). The registration request information includes a name (title) and a price of the electronic data entered in the data selection area 705, the assigned hash value, and identification information (for example, ID "press A") for identifying the service provider. Accordingly, the communication unit 81 of the node 80 receives the registration request information transmitted from the service provider apparatus 70*a*.

The asset processing unit 84 of the node 80 generates asset information indicating electronic data to be exchanged on the blockchain 8 by using various data contained in the registration request information received by the communication unit 81 (S16). Then, the storing and reading unit 89 of the node 80 stores the asset information generated by the asset processing unit 84 in the storage unit 8000 (S17).

FIG. 10 is a conceptual diagram illustrating an example of asset information stored in a node according to the first embodiment. In this disclosure, the asset information is various types of unique information regarding a particular item to be exchanged. Specifically, in the example of FIG. 10, unique information regarding the e-book the item to be exchanged is illustrated, as an example of asset. The asset information includes, for each asset ID assigned to each asset, information on a hash value assigned by the service provider apparatus 70, a name (in this example, title) of an item to be exchanged, an owner and an issuer of the item to be exchanged, and a transaction amount (price) of the item to be exchanged, in association with one another. Each item of the asset information has a value, indicated by corresponding data item contained in the registration request information received by the communication unit 81. For example, the asset information identified with an asset identifier "B0001" has a hash value uniquely assigned to an e-book as an item to be exchanged, a name (title) "E-book A", an owner "pressA", an issuer "pressA", and a price "500".

Next, the transaction processing unit 83 generates transaction information indicating a history of transactions of data to be exchanged on the blockchain 8 (S18). Then, the storing and reading unit 89 of the node 80 stores the transaction information generated by the transaction processing unit 83 in the storage unit 8000 (S19).

FIGS. 11A and 11B are conceptual diagrams each illustrating an example of transaction information stored in a node according to the first embodiment. The transaction information contains a history of transactions (exchange) of the item having been exchanged. The transaction information has a record, called a block, which corresponds to one transaction, and blocks are listed continuously as they increase in number. One block contains a timestamp and a link to the previous block. Once the transaction information is recorded, data in the block cannot retrospectively be altered. Therefore, the blockchain 8 can guarantee reliability of transactions by referring to the transaction information and checking its validity, by the plurality of nodes 80 of the blockchain 8.

As illustrated in FIGS. 11A and 11B, each block of transaction information includes, for a transaction ID assigned to each transaction (exchange), a hash value for uniquely identifying a transaction, a transaction type indicating the type of the transaction, a time stamp indicating the date and time when the transaction was performed, an asset ID for identifying an item exchanged (transaction item), a hash value corresponding to the item exchanged, and information on the issuer and owner of the item exchanged, in association.

In this example, at S18, the transaction processing unit 83 generates first transaction illustrated in FIG. 11A. Specifically, the transaction processing unit 83 generates, as a block with the transaction ID "T0011", transaction information (first transaction information) that describes a hash value "4390s058239052 . . . " for identifying a transaction, a transaction type "asset generation" indicating that an asset is generated at S16, a time stamp indicating a date and time when the asset is generated, and unique information (asset ID, hash value, issuer, and owner) related to the generated asset.

When the asset is registered, the communication unit 81 of the node 80 transmits a notification indicating completion of electronic data registration to the service provider apparatus 70*a* (S20). Accordingly, the communication unit 71*a* of the service provider apparatus 70*a* receives the registration completion notification transmitted from the node 80.

On the other hand, in response to reception of a predetermined operation by the service provider, the display control unit 73*b* of the service provider apparatus 70*b* causes the display 506 to display the data registration screen 700 illustrated in FIG. 9 (S21). Next, the reception unit 72*b* of the service provider apparatus 70*b* receives an electronic data registration request, when the service provider selects electronic data to be registered and presses the "register" button 708 (S22). In response to reception of registration of the electronic data by the reception unit 72*b*, the data manager 75*b* of the service provider apparatus 70*b* assigns a hash value corresponding to the electronic data to be registered (S23). Then, the data manager 75*b* of the service provider apparatus 70*b* stores, in the data management DB 7001*b* (see FIG. 7A), information on a data file of the electronic data corresponding to the registration request received at S22 and the hash value assigned at S23 in association with each other (S24). In this case, the data manager 75*b* stores a name (title) of the electronic data input to the data selection area 705 and the hash value in association with the data file of the electronic data.

Next, the communication unit 71*b* of the service provider apparatus 70*b* transmits, to the node 80, registration request information indicating a request for registering the unique data related to the data file registered in the data management DB 7001*b* (S25). The registration request information includes a name (title) and a price of the electronic data entered in the data selection area 705, the assigned hash value, and identification information (for example, ID "press R") for identifying the service provider. Accordingly, the communication unit 81 of the node 80 receives the registration request information transmitted from the service provider apparatus 70*b*.

The asset processing unit 84 of the node 80 generates asset information indicating electronic data to be exchanged on the blockchain 8 by using various data contained in the registration request information received by the communication unit 81 (S26). Then, the storing and reading unit 89 of the node 80 stores the asset information generated by the asset processing unit 84 in the storage unit 8000 (S27). In this example, the asset processing unit 84 generates, as an asset identified with the asset ID "B0002" illustrated in FIG. 10, asset information that describes a hash value assigned by the service provider apparatus 70*b*, a name (title) "E-book B", an owner "pressR", an issuer "pressR", and a transaction amount (price) "800".

Next, the transaction processing unit 83 generates transaction information indicating a history of transactions of data to be exchanged on the blockchain 8 (S28). In this example, the transaction processing unit 83 generates second transaction information as illustrated in FIG. 11B. Specifically, the transaction processing unit 83 generates, as a block with the transaction ID "T0021", transaction information (second transaction information) that describes a hash value "6g764368d50fdk . . . " for identifying a transaction, a transaction type "asset generation" indicating that an asset is generated at S26, a time stamp indicating a date and time when the asset is generated, and unique information (asset ID, hash value, issuer, and owner) related to the generated asset. Then, the storing and reading unit 89 of the node 80 stores the transaction information (second transaction information) generated by the transaction processing unit 83 in the storage unit 8000 (S29).

When the asset is registered, the communication unit 81 of the node 80 transmits a notification indicating completion of electronic data registration to the service provider apparatus 70*b* (S30). Accordingly, the communication unit 71*b* of the service provider apparatus 70*b* receives the registration completion notification transmitted from the node 80.

In this example, the node 80 transmits the asset information and the transaction information, which are stored in the storage unit 8000 at S17, S19, S27, and S29, to other nodes 80 on the blockchain 8, so that information are shared between the nodes 80 on the blockchain 8. Accordingly, the same information is kept at each of the plurality of nodes 80 on the blockchain 8.

In this way, the service provider apparatus 70 is able to register information for identifying electronic data to be provided to the user in each node 80 of the blockchain 8, no matter which service provider apparatus 70 requests to register. Any node 80 of the blockchain 8 is able to uniquely identify data registered by any service provider apparatus 70 rising a hash value assigned to each data.

The following describes the example case in which transaction information is generated for each asset (first transaction information and second transaction information) as illustrated in FIGS. 11A and 11B. However, as illustrated in FIG. 12, the transaction processing unit 83 may generate one item of transaction information to indicate more than one transaction on the blockchain 8. Further, the processing of S16 to S17 and the processing of S18 to S19 may be performed in a reverse order. Similarly, the processing of S26 to S27 and the processing of S28 to S29 may be performed in a reverse order.

Exchange (Transaction) of Electronic Data

Figure 13:
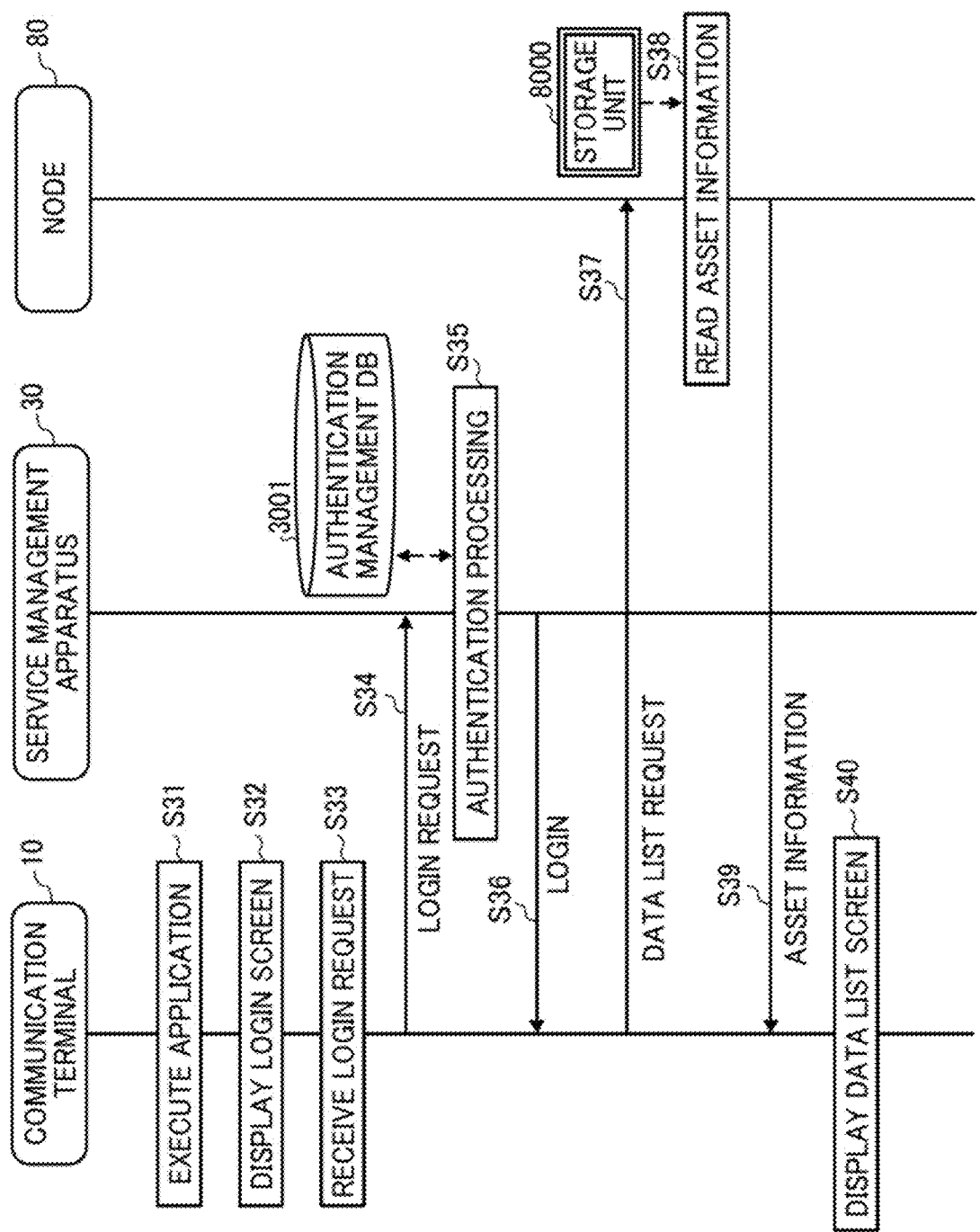
FIG. 13 is a sequence diagram illustrating an example of processing to exchange electronic data between the communication terminal and the service provider apparatus according to the first embodiment.
Figure 14:
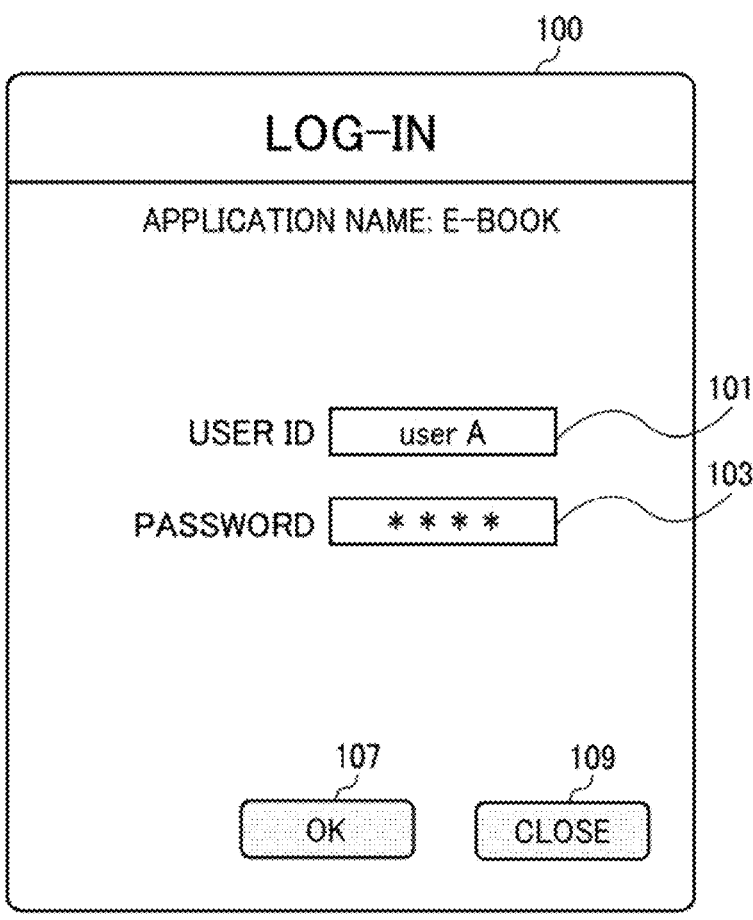
FIG. 14 is a diagram illustrating an example login screen displayed at the communication terminal according to the first embodiment.
Figure 15:
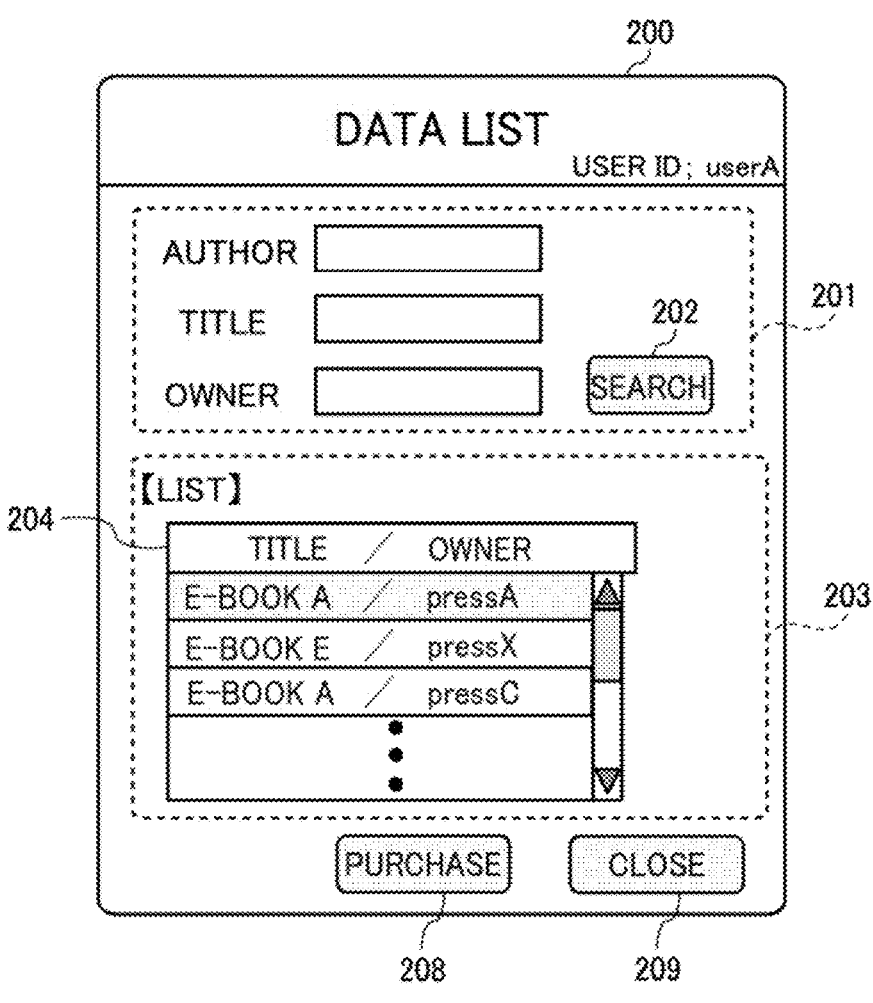
FIG. 15 is a diagram illustrating an example data list screen displayed at the communication terminal according to the first embodiment.
Figure 16:
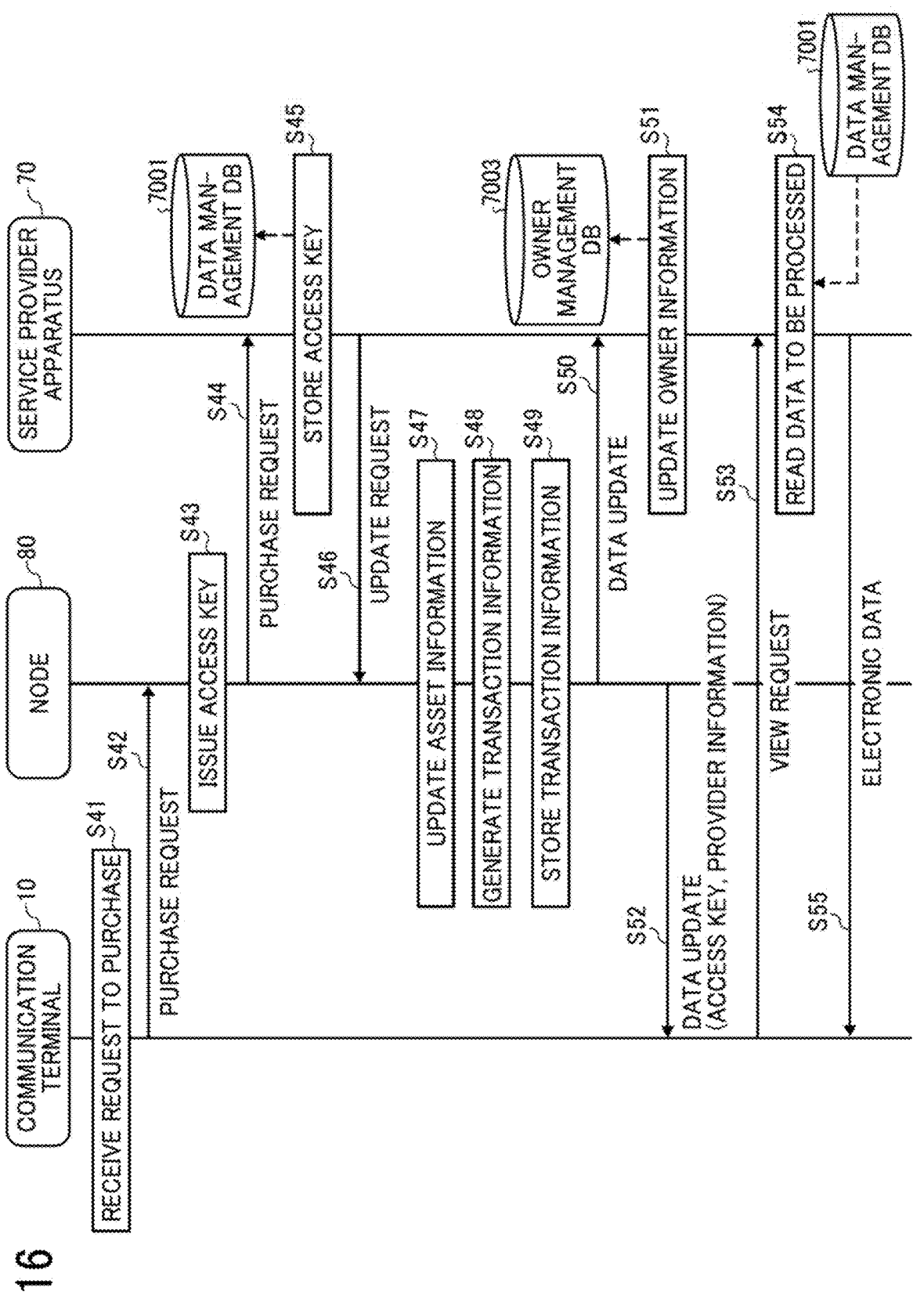
FIG. 16 is a sequence diagram illustrating an example of processing to exchange electronic data between the communication terminal and the service provider apparatus according to the first embodiment.

Next, referring to FIGS. 13 to 18, processing to exchange electronic data performed by the network system 1*a* is described according to the embodiment. FIGS. 13 and 16 are sequence diagrams illustrating an example of processing to exchange electronic data between the communication terminal and the service provider apparatus according to the first embodiment. The following describes an example case in which the user browses an e-book using the communication terminal 10, as an example of exchange of electronic data using the communication terminal 10 and the service provider apparatus 70.

First, in response to the user A operating the communication terminal 10, the application execution unit 15 of the communication terminal 10 activates the e-book application 170*a*, which is application installed on the communication terminal 10 (S31). Next, the display control unit 13 of the communication terminal 10 causes the display 506 to display a login screen 100, which allows the user to input user information for logging in to the executed e-book application 170*a* (S32). FIG. 14 is a diagram illustrating an example login screen displayed at the communication terminal according to the first embodiment. The login screen 100 illustrated in FIG. 14 includes an input field 101 and an input field 103 for respectively inputting a user ID and a password of a user, an "OK" button 107 to be pressed to request login, and a cancel button 109 to be pressed to cancel login.

Next, when the user A inputs his or her user ID in the input field 101, inputs his or her password in the input field 103, and presses the "OK" button 107, the reception unit 12 of the communication terminal 10 receives a login request (S33). Then, the communication unit 11 transmits login request information indicating a login request to the service management apparatus 30 (S34). The login request information includes the user ID and the password input at S33. Accordingly, the communication unit 31 of the service management apparatus 30 receives the login request information transmitted from the communication terminal 10. The user ID and the password may be stored in advance in the communication terminal 10 or in a recording medium such as a subscriber identity module (SIM) card or an SD card connectable to the communication terminal 10. In such case, in response to execution of the e-book application 170*a* at S31, the communication unit 11 of the communication terminal 10 automatically transmits login request information to the service management apparatus 30 via the communication network 5.

Next, the authentication unit 32 of the service management apparatus 30 searches the authentication management table (see FIG. 6A) using the user ID and password received by the communication unit 31 as search keys, and determines whether the same pair of user ID and the password is stored, to perform user authentication (S35). The following assumes that the authentication unit 32 determines that the user A is a legitimate user who is authorized. Then, the communication unit 31 transmits a login notification indicating that the user A has successfully logged in to the communication terminal 10, which is the request source (S36). Accordingly, the communication unit 11 of the communication terminal 10 receives the login notification transmitted from the service management apparatus 30.

Next, the communication unit 11 of the communication terminal 10 transmits, to the node 80, a data list request indicating a request for a list of data indicated in the asset information registered in the blockchain 8 (S37). Accordingly, the communication unit 81 of the node 80 receives the data list request transmitted from the communication terminal 10.

Next, the storing and reading unit 89 of the node 80 reads the asset information stored in the storage unit 8000 (S38). Then, the communication unit 81 transmits the asset information read by the storing and reading unit 89 to the communication terminal 10 as the request source (S39). Accordingly, the communication unit 11 of the communication terminal 10 receives the asset information transmitted from the node 80.

Then, the display control unit 13 of the communication terminal 10 causes the display 506 to display a data list screen 200, which lists data of e-books related to the asset information transmitted from the node 80 (S40). FIG. 15 is a diagram illustrating an example data list screen displayed at the communication terminal according to the first embodiment. The data list screen 200 illustrated in FIG. 15 includes an input area 201 for inputting a search condition (parameter) for searching for an e-book, a list display area 203 indicating a search result using data input to the input area 201, a "purchase" button 208 to be pressed to purchase an e-book, and a "close" button 209 to be pressed to cancel transaction (purchase) of e-book. The input area 201 is input with bibliographic information such as an author name or a title, a keyword in relation to an item of e-book such as an owner, etc. When the "search" button 202 is pressed, the communication terminal 10 executes a search using the input information such as the input keyword. The list display area 203 displays information on the title and owner of the e-book indicated in the received asset information. The list display area 203 further includes a selection menu 204 that allows the user to select one or more items, from among the displayed items of asset information.

Next, referring to FIG. 16, when the user A selects a particular item from the selection menu 204 and presses the "purchase" button 208, the reception unit 12 of the communication terminal 10 receives a purchase request indicating a request to purchase the selected e-book (S41). Then, the communication unit 11 of the communication terminal 10 transmits purchase request information indicating a purchase request for the selected e-book to the node 80 (S42). The purchase request information includes user identification information (for example, user ID) for identifying the user A authenticated at S35 and information on the hash value assigned to the selected e-book. Accordingly, the communication unit 81 of the node 80 receives the purchase request information transmitted from the communication terminal 10.

Next, the issuing unit 82 of the node 80 issues an access key for the e-book to be purchased (S43). The communication unit 81 transmits purchase request information to the service provider apparatus 70 of the service provider who is the owner of the e-book to be purchased (S44). The purchase request information includes the hash value indicated in the asset information stored in the storage unit 8000 and the access key issued by the issuing unit 82. For example, the node 80 identifies the owner of the e-book to be purchased using the hash value of the e-book, and transmits the purchase request information to the service provider apparatus 70 of the service provider, which is the current owner. Alternatively, the node 80 may identify the current owner, in case the purchase request information transmitted from the communication terminal 10 includes information on the owner. Thus, the communication unit 71 of the service provider apparatus 70 receives the purchase request information transmitted from the node 80. In this example, it is assumed that the node 80 stores information indicating an address of the service provider apparatus 70.

Next, the data manager 75 of the service provider apparatus 70 stores the hash value and the access key received by the communication unit 71 in the data management DB 7001 (see FIG. 7A) in association with each other (S45).

Next, the communication unit 71 of the service provider apparatus 70 transmits, to the node 80, update request information indicating a request to update the database registered in the blockchain 8 (S46). The update request information includes the user identification information (for example, user ID) for identifying the user A received at S42, the hash value indicating the electronic data for which information is to be updated, and provider information indicating a destination (address) of the service provider apparatus 70. The provider information is, for example, a uniform resource locator (URL) or a uniform resource identifier (URI) of the service provider apparatus 70.

Accordingly, the communication unit 81 of the node 80 receives the update request information transmitted from the service provider apparatus 70.

The asset processing unit 84 of the node 80 updates the asset information stored in the storage unit 8000 (S47). FIG. 17 is a conceptual diagram illustrating an example of asset information updated at S47. As illustrated in FIG. 17, the asset processing unit 84 changes the information on the owner of the asset identified with the asset identifier "B0001" from "pressA" to "userA". Accordingly, the ownership of the "E-book A" identified with the asset identifier "B0001" is transferred from "pressA" to "userA". That is, the owner of the "E-book A" identified with the asset identifier "B0001" becomes "userA", such that the right for using the "E-book A" identified with the asset identifier "B0001" is given to the user A identified with the user ID "userA". With this transfer of ownership, the user A acquires an access right to the "E-book A".

Figure 18:
FIG. 18 is a conceptual diagram illustrating an example transaction information generated at S48.

Further, the transaction processing unit 83 generates transaction information corresponding to the update of the asset information at S47 (S48). Then, the storing and reading unit 89 stores the transaction information generated by the transaction processing unit 83 in the storage unit 8000 (S49). FIG. 18 is a conceptual diagram illustrating an example transaction information generated at S48. The transaction processing unit 83 generates a block of a new transaction in the first transaction information, so as to reflect the transaction in which the use right of the E-book A is transferred from "pressA" to "userA". As illustrated in FIG. 18, the transaction processing unit 83 describes, in the block with the transaction ID "T0012" that is newly added, the transaction type "asset allocation" that indicates the processing of allocating the use right to the new owner at S48. The transaction processing unit 83 writes, in the block identified with the transaction ID "T0012", the hash value "862ywj8j98wqcn . . . ," for identifying the transaction, the time stamp "2020/01/15/19:15:07" indicating the date and time when the asset is allocated, and the unique information regarding the allocated asset (the asset identifier "B0001", the hash value "169467983253a7 . . . ", and the new owner "userA"). The processing of S47 and the processing of S48 to S49 may be performed in a reverse order.

Next, the communication unit 81 of the node 80 transmits, to the service provider apparatus 70, a data update notification indicating that the data registered in the blockchain 8 has been updated (S50). The data update notification includes various kinds of information indicated in the asset information updated at S47. Accordingly, the communication unit 71 of the service provider apparatus 70 receives the data update notification transmitted from the node 80. The data manager 75 of the service provider apparatus 70 updates the owner information registered in the owner management DB 7003 (see FIG. 7B) (S51). Specifically, in this example, the data manager 75 changes the owner of the "E-book A" included in the owner information from "pressA" to "userA". Further, the communication unit 81 transmits a data update notification indicating that the data registered in the blockchain 8 has been updated, to the communication terminal 10 (S52). The data update notification includes the access key issued at S43 and the provider information received at S46. Accordingly, the communication unit 11 of the communication terminal 10 receives the data update notification transmitted from the node 80.

In this way, the ownership of "E-book A" is transferred from "pressA" to "userA". With this transfer of ownership, the user A who uses the communication terminal 10 becomes able to view the E-book A. The communication unit 11 of the communication terminal 10 transmits view request information indicating a request for viewing the E-book A to the service provider apparatus 70, which is the issuer of the E-book A indicated in the provider information received at S52 (S53). The view request information includes the access key of the E-book A received at S52. Accordingly, the communication unit 71 of the service provider apparatus 70 receives the view request information transmitted from the communication terminal 10. The storing and reading unit 79 of the service provider apparatus 70 searches the data management table (see FIG. 7A) using the access key received by the communication unit 71 as a search key, to read electronic data of the e-book A (S54). Then, the communication unit 71 of the service provider apparatus 70 transmits the electronic data of the E-book A to the communication terminal 10 (S55). Thus, the communication unit 11 of the communication terminal 10 receives the electronic data transmitted from the service provider apparatus 70.

In this way, the communication terminal 10 allows the user to select and purchase a desired electronic book from among a plurality of electronic books registered on the blockchain 8 by a plurality of service providers. Accordingly, the user having the ownership of the electronic book can browse the purchased electronic book by accessing the service provider apparatus 70 using the access key transmitted from the blockchain 8.

FIG. 16 illustrates an example case in which the communication terminal 10 accesses the service provider apparatus 70 using the access key every time the communication terminal 10 browses an e-book at S53 to S55. Alternatively, the communication terminal 10 may download an electronic data file of a particular e-book from the service providing apparatus 70.

In the above description, an example case of exchanging an e-book is described as an example of electronic data as an item to be exchanged. The electronic data as the item to be exchanged is not limited to this example, and may be video data, still image data, music data, voice data, document data, etc. In either case, the communication terminal 10 carries out transactions (exchange) with the service provider apparatus 70 using the blockchain 8 by using a dedicated application corresponding to an item to be exchanged, as illustrated in FIG. 3.

Further, the network system 1 may be configured such that the service provider apparatus 70 provides the service of exchanging electric power using the power exchange application 170*c* installed on the communication terminal 10. In such case, the service provider operating the service provider apparatus 70 is a power retailer (intermediary agent) that intermediates transfer of ownership of electricity between a power producer such as an electric power company and a user as a consumer. The user and the service provider carry out transaction of an asset (i.e., exchange of ownership of electricity), based on data indicating an amount of electricity (the power production amount and the power consumption amount) managed on the blockchain 8. The service provider may also service as a certificate issuing company that issues a certificate, or an intermediate agent that issues a certificate on behalf of a certification authority. The certificate, which may be electronic data, certifies an amount of electricity (consumed power) and/or a production method of electricity. For example, the production method of electricity indicates that electricity is produced from either or any combination of particular renewable energy, such as solar light, wind power, biomass, geothermal heat, hydroelectric power, solar heat, heat in the atmosphere, or other heat existing in the nature.

In comparison with power generation using fossil fuels such as oil, coals, and liquefied natural gases, power generation using renewable energies hardly emits $CO_2$ that causes global warming. Therefore, among resources used for power production, renewable energies are environmentally friendly energy sources. In view of this, to prove a transaction of electricity produced from renewable energy, a certificate (electronic data of certificate) is used, which has been issued by a certification authority such as a certificate issuing company approved by a national or local public institution. The certificate of electricity is referred to as, for example, a green power certificate. For example, in case the user is a certain company, the company can apply for issuance of a certificate and use the issued certificate to prove creation of an added value to the environment, thus improving the brand credibility. In such case, the item to be exchanged is electricity, which is produced by an electric power producer such as an electric power company and provided (intermediated) by a service provider. The accompanying data accompanying the electricity as the item to be exchanged is the certificate of electricity.

In example operation, the communication unit 71 of the service provider apparatus 70 receives, for example, a transaction (exchange) request for electricity from the communication terminal 10 of the user A. The communication unit 71 further transmits a change request for changing ownership of electricity, which is an example of an asset, to the node 80 of the blockchain 8. The asset processing unit 84 of the node 80 changes the ownership of electricity, which is an example of an asset, from the provider to the user A. Then, the service provider apparatus 70 provides the communication terminal 10 of the user A, who is now the owner due to the change in response to the transmitted change request, with the certificate of electricity that is accompanying data accompanying electricity as an item that is exchanged. With the certificate of electricity, the user A can apply for public subsidy, for example, based on the renewable energy usage ratio (or $CO_2$ reduction rate) of the user company.

Exchange (Transaction) Between Users

Figure 19:
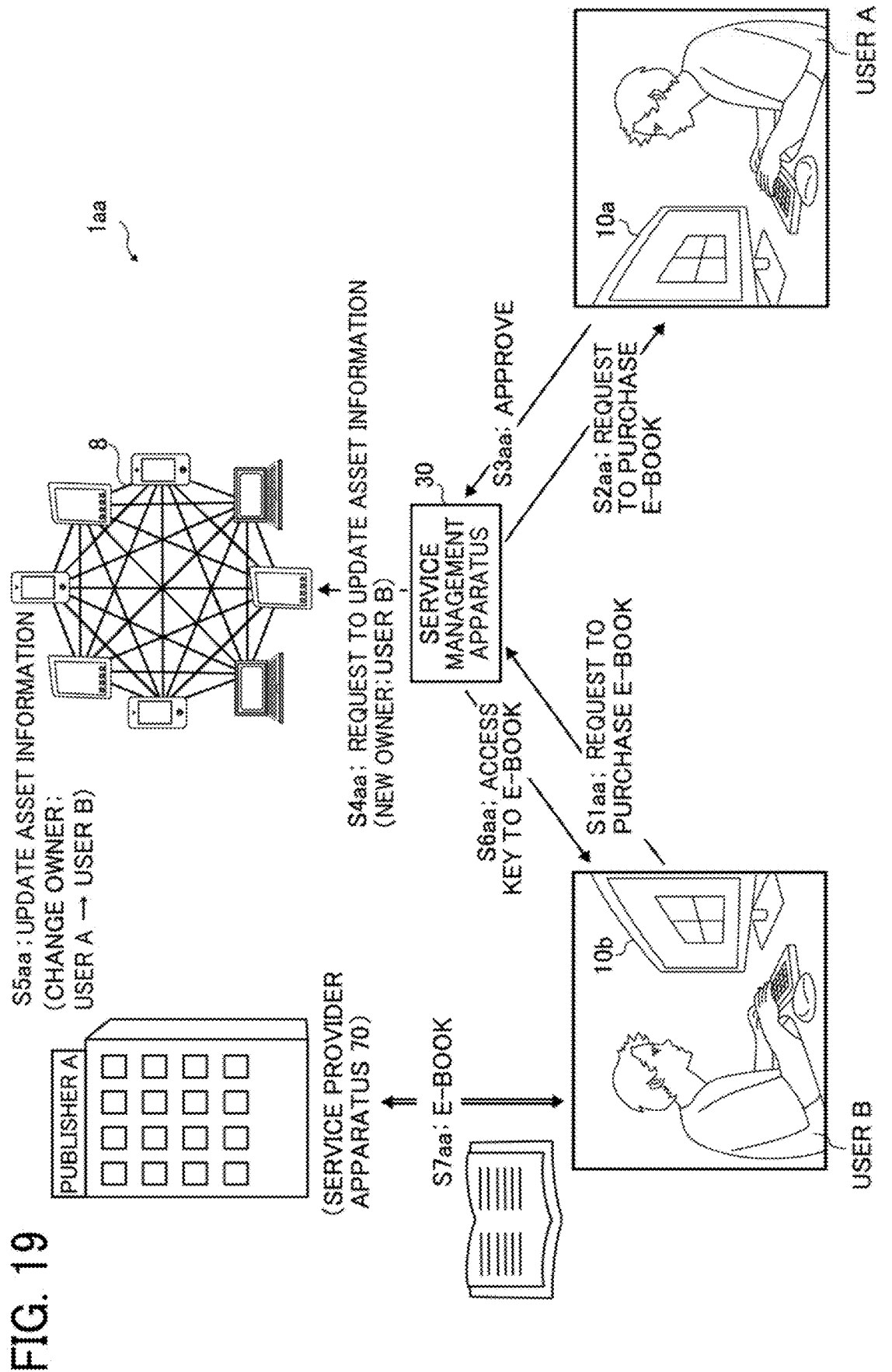
FIG. 19 is a diagram illustrating another example of exchanging electronic data between users, performed by the network system, according to the first embodiment.
Figure 20:
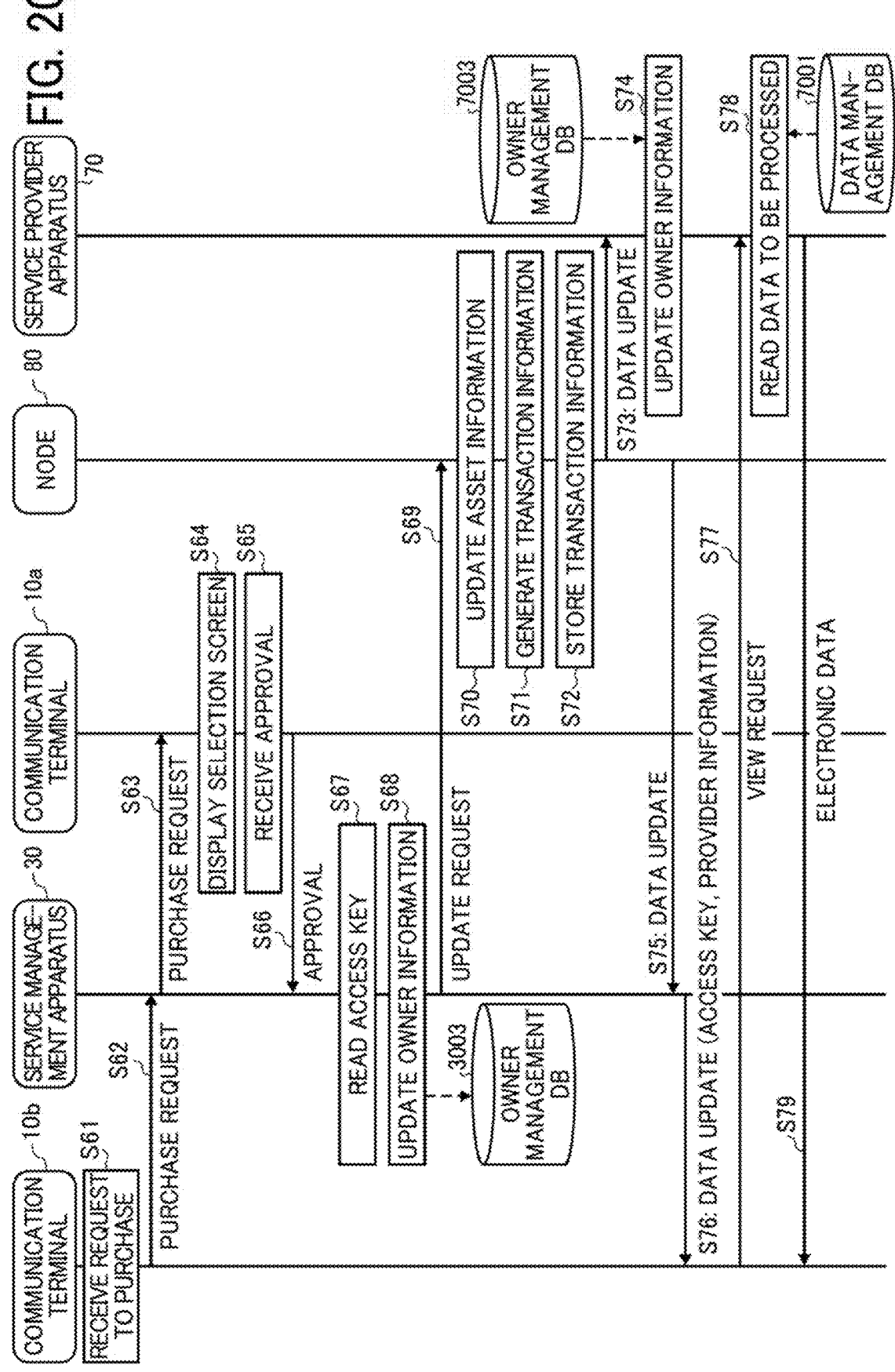
FIG. 20 is a sequence diagram illustrating another example of processing to exchange electronic data between a plurality of communication terminals according to the first embodiment.

In the following, another example of the network system according to the first embodiment is described. The network system 1aa illustrated in FIG. 19 is an example case in which electronic transactions are carried out between a plurality of communication terminals. FIG. 19 is a diagram illustrating another example of exchanging electronic data between users, performed by the network system, according to the first embodiment. FIG. 19 illustrates an example case in which a user B purchases, from the user A, an electronic book (for example, "E-book A") that the user A has purchased through the above-described processing and has ownership of.

First, the user B who wants to purchase an e-book transmits a purchase request for the e-book to the service management apparatus 30 using the communication terminal 10b (S1aa). Next, the service management apparatus 30 transmits a purchase request for the e-book to the communication terminal 10a of the user A who is the owner of the requested e-book (S2aa). Then, the user A transmits an approval notification for the purchase request from the user B to the service management apparatus 30 (S3aa). The service management apparatus 30 transmits an update request for the asset information corresponding to the e-book to be purchased to the blockchain 8 (S4aa).

Next, the node 80 of the blockchain 8 updates the asset information corresponding to the e-book to be exchanged in response to the update request transmitted from the service management apparatus 30 (S5aa). Specifically, the node 80 changes the ownership of the e-book to be exchanged from the user A to the user B. Thus, on the blockchain 8, the owner of the purchased e-book becomes the user B.

Further, the service management apparatus 30 transmits the access key of the e-book to the communication terminal 10b (S6aa). The communication terminals 10b then accesses the service provider apparatus 70 using the access key transmitted from the service management apparatus 30, to browse the purchased e-book (S7aa).

In this way, the user B who has acquired the ownership of the e-book can browse the e-book purchased from the user A. When the number of items of data provided from the service provider apparatus 70 increases, management of copyrights and the like of copyrighted materials such as e-books becomes complicated, increasing the burden on the service provider in management. In view of this, with the network system 1aa, the burden on the service provider in management can be reduced, which may be caused due to the increase in accumulated number of items to be exchanged. In particular, the network system 1aa allows the items to be exchanged, provided from the service provider apparatus 70, to be exchanged between users.

FIG. 19 is a sequence diagram illustrating another example of processing to exchange electronic data between a plurality of communication terminals according to the first embodiment. Since the processing up to displaying of a display screen (for example, the data list screen 200 of FIG. 15) for causing the communication terminals 10b to select an e-book to be purchased is the same as the processing from S31 to S40 in FIG. 13, the description thereof will be omitted. The following assumes that the owner of the e-book identified with the asset ID "B0001", from among the asset information registered in the blockchain 8, is "userA" (see FIG. 17).

The reception unit 12b of the communication terminal 10b receives the purchase request for the selected e-book (S61). In the following description, it is assumed that the "E-book A" is selected by the user B. Next, the communication unit 11b transmits purchase request information indicating a request to purchase the selected "E-book A", to the service management apparatus 30 (S62). The purchase request information includes user identification information (for example, a user ID) for identifying the user B and information of a hash value assigned to "E-book A". Accordingly, the communication unit 31 of the service management apparatus 30 receives the purchase request information transmitted from the communication terminal 10b.

Figure 21:
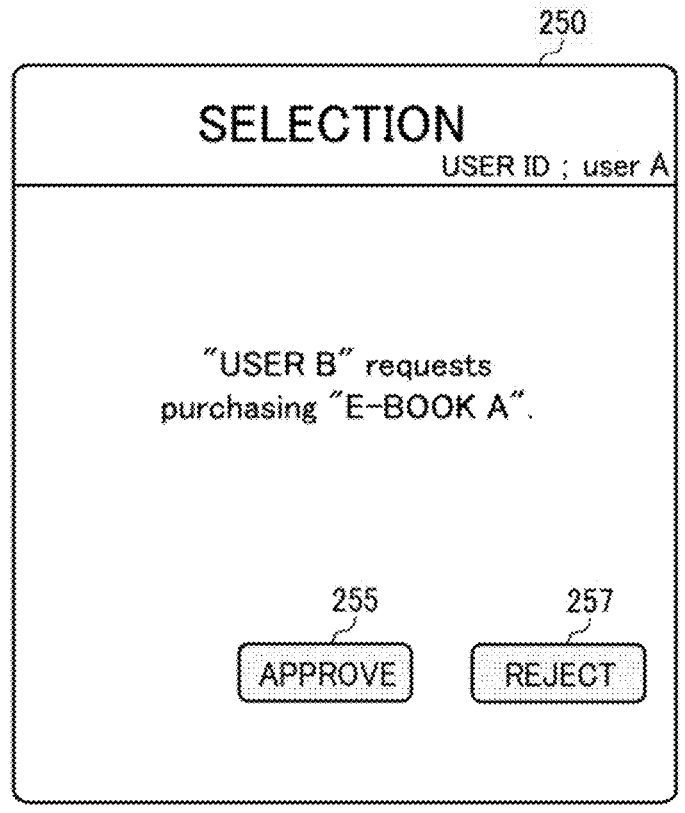
FIG. 21 is a diagram illustrating an example selection screen displayed at the communication terminal according to the first embodiment.

Next, the communication unit 31 of the service management apparatus 30 transmits the purchase request information transmitted from the communication terminal 10b to the communication terminal 10a operated by the user A who is the owner of the "E-book A" (S63). For example, the service management apparatus 30 refers to the owner management table (FIG. 6B) to obtain information on the owner of the selected e-book, using the hash value of the selected e-book. Using the obtained information on the owner, the service management apparatus 30 transmits the purchase request information to the communication terminal 10a of the user A, which is the current owner of the "E-book A". Alternatively, the service management apparatus 30 may identify the current owner, using information on the owner if such information is included in the purchase request information transmitted from the communication terminal 10b. Thus, the communication unit 11*a* of the communication terminal 10*a* receives the purchase request information transmitted from the service management apparatus 30. The display control unit 13*a* of the communication terminal 10*a* causes the display 506 to display a selection screen 250 for selecting whether or not to approve the purchase request information transmitted from the service management apparatus 30 (S64). FIG. 21 is a diagram illustrating an example selection screen displayed at the communication terminal according to the first embodiment. The selection screen 250 illustrated in FIG. 21 includes an "approve" button 255 to be pressed to approve the purchase request and a "reject" button 257 to be pressed to reject the purchase request.

Next, the reception unit 12*a* of the communication terminal 10*a* receives an approval for the purchase request, in response to pressing of the "approve" button 255 by the user A (S65). The communication unit 11*a* of the communication terminal 10*a* transmits an approval notification for the purchase request to the service management apparatus 30 (S66). The approval notice includes information on the hash value assigned to the e-book for which purchase has been approved. Accordingly, the communication unit 31 of the service management apparatus 30 receives the approval notification transmitted from the communication terminal 10*a*.

Next, the storing and reading unit 39 of the service management apparatus 30 searches the owner management table (see FIG. 6B) using the hash value included in the purchase request information received at S62 or the approval notification received at S66 as a search key, to read the corresponding access key and provider information (S67). Further, the data manager 34 of the service management apparatus 30 updates the owner information of "E-hook A" stored in the owner management DB 3003 (S68). In this example case, the data manager 34 changes the owner of the "E-book A" from "user A" to "userB".

Then, the communication unit 31 of the service management apparatus 30 transmits update request information indicating a request to update the registered information to the node 80 (S69). The update request information includes user identification information (for example, user ID) for identifying the user as the owner having been updated at S68, and information on the hash value indicating electronic data for which information is updated. Accordingly, the communication unit 81 of the node 80 receives the update request information transmitted from the service management apparatus 30.

Next, the asset processing unit 84 of the node 80 updates the asset information stored in the storage unit 8000 (S70). FIG. 22 is a conceptual diagram illustrating an example of asset information updated at S70. As illustrated in FIG. 22, the asset processing unit 84 changes the information on the owner of the asset identified with the asset identifier "B0001" from "userA" to "userB". Accordingly, the ownership of the "E-book A" identified with the asset identifier "B0001" is transferred from "userA" to "userB". The owner of the "E-book A" identified with the asset identifier "B0001" becomes "userB", such that the right for using the "E-book A" identified with the asset identifier "B0001" is given to the user B identified with the user ID "userB". That is, the user B acquires an access right to the "E-book A".

Further, the transaction processing unit 83 generates transaction information corresponding to the update of the asset information at S70 (S71). Then, the storing and reading unit 89 stores the transaction information generated by the transaction processing unit 83 in the storage unit 8000 (S72). FIG. 23 is a conceptual diagram illustrating an example transaction information generated at S71. The transaction processing unit 83 generates a block of a new transaction in the first transaction information, so as to reflect the transaction in which the ownership of the E-book A is transferred from "userA" to "userB". As illustrated in FIG. 23, the transaction processing unit 83 describes, in the block with the transaction ID "T0013" that is newly added, the transaction type "asset allocation" that indicates the processing of allocating the asset (in this case, e-book) to the new owner at S70. The transaction processing unit 83 writes, in the block identified with the transaction ID "T0013", the hash value "175v8j4ttkfkd3 . . . " for identifying the transaction, the time stamp "2020/01/24/19:35:09" indicating the date and time when the asset is allocated, and the unique information regarding the allocated asset (the asset identifier "B0001", the hash value "169467983253a7 . . . ", and the new owner "userB"). The processing of S70 and the processing of S71 to S72 may be performed in a reverse order.

Next, the communication unit 81 of the node 80 transmits, to the service provider apparatus 70, a data update notification indicating that the data registered in the blockchain 8 has been updated (S73). The data update notification includes various kinds of information indicated in the asset information updated at S70. Accordingly, the communication unit 71 of the service provider apparatus 70 receives the data update notification transmitted from the node 80. The data manager 75 of the service provider apparatus 70 updates the owner information of the "E-book A" stored in the owner management DB 7003 (see FIG. 7B) (S74). Specifically, in this example, the data manager 75 changes the owner of the "E-book A" included in the owner information from "userA" to "userB".

Next, the communication unit 81 of the node 80 transmits, to the service management apparatus 30, a data update notification indicating that the data registered in the blockchain 8 has been updated (S75). Accordingly, the communication unit 31 of the service management apparatus 30 receives the data update notification transmitted from the node 80. The communication unit 31 of the service management apparatus 30 transmits, to the communication terminal 10*b*, a data update notification indicating that the data registered in the blockchain 8 has been updated (S76). The data update notification includes the access key and the provider information read at S67. Accordingly, the communication unit 11*b* of the communication terminal 10*b* receives the data update notification transmitted from the node 80.

Accordingly, the ownership of the "E-book A" is transferred from "userA" to "userB". Then, the user B who uses the communication terminal 10*b* becomes able to view the E-book A. The communication unit 11*b* of the communication terminal 10*b* transmits view request information indicating a request for viewing the E-book A to the service provider apparatus 70, which is the issuer of the E-book A indicated in the provider information received at S76 (S77). The view request information includes the access key of the E-book A received at S76. Accordingly, the communication unit 71 of the service provider apparatus 70 receives the view request information transmitted from the communication terminal 10*b*. The storing and reading unit 79 of the service provider apparatus 70 searches the data management table (see FIG. 7A) using the access key received by the communication unit 71 as a search key, to read electronic data of the e-book A (S78). Then, the communication unit 71 of the service provider apparatus 70 transmits the electronic data of the E-book A to the communication terminal 10*b* (S79). Thus, the communication unit 11*b* of the communication terminal 10*b* receives the electronic data transmitted from the service provider apparatus 70.

As described above, by using the asset information managed on the blockchain 8, the network system 1*aa* is able to carry out, not only a transaction between a user and a service provider, but also a transaction between a plurality of users, while keeping reliability at a sufficient level. In the above-described transaction between the service provider and the user in the network system 1*a*, the communication terminal 10 may transmit and receive various information to and from the node 80 via the service management apparatus 30.

Figure 24:
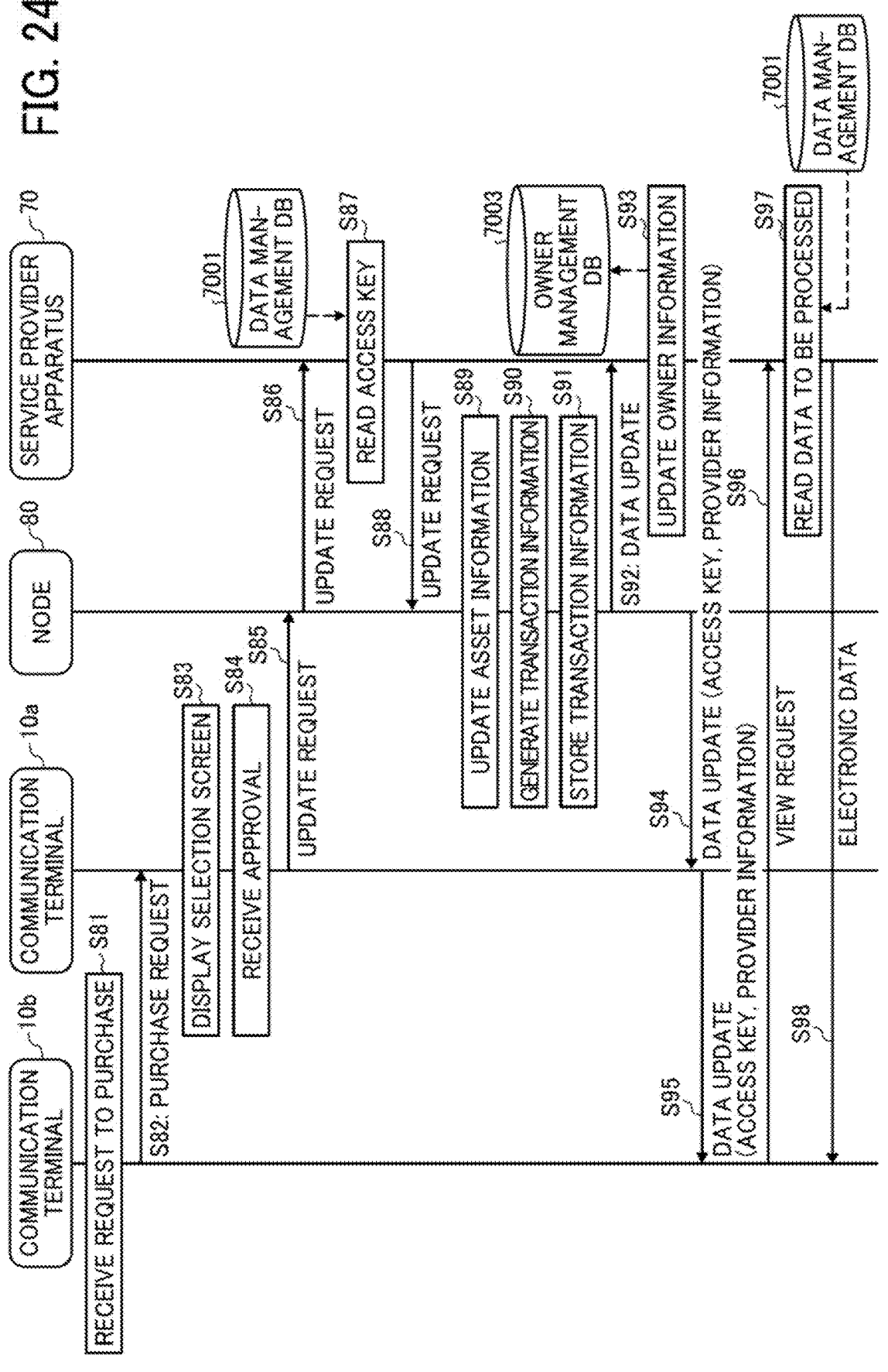
FIG. 24 is a sequence diagram illustrating another example of processing to exchange electronic data between a plurality of communication terminals according to the first embodiment.

In this disclosure, FIGS. 19 to 23 illustrate an example case in which transactions are carried out between the plurality of communication terminals 10 (10*a*, 10*b*) via the service management apparatus 30. Alternatively, as illustrated in FIG. 24, the plurality of communication terminals 10 (10*a*, 10*b*) may directly communicate with each other without intervening the service management apparatus 30. The alternative example will be described in detail below.

The reception unit 12*b* of the communication terminal 10*b* receives the purchase request for the selected e-book (S81). In the following description, it is assumed that the "E-book A" is selected by the user B. Next, the communication unit 11*b* transmits purchase request information indicating a request to purchase the selected "E-book A", to the communication terminal 10*a* (S82). The purchase request information includes user identification information (for example, a user ID) for identifying the user B and information of a hash value assigned to "E-book A". Thus, the communication unit 11*a* of the communication terminal 10*a* receives the purchase request information transmitted from the communication terminal 10*b*. In this example, the communication terminal 10*b* identifies the current owner of the selected e-book, using information that can be obtained from the data list screen 200 (FIG. 15).

The display control unit 13*a* of the communication terminal 10*a* causes the display 506 to display a selection screen 250 (see FIG. 21) for selecting whether or not to approve the purchase request information transmitted from the communication terminal 10*a* (S83). Next, the reception unit 12*a* of the communication terminal 10*a* receives an approval for the purchase request, in response to pressing of the "approve" button 255 by the user A (S84). Then, the communication unit 11*a* of the communication terminal 10*a* transmits purchase request information indicating the request to purchase the "E-book A" by the user B, to the node 80 (S85). The purchase request information includes the user identification information received at S82 (that is, the user B) and information on the hash value assigned to "E-book A". The communication unit 81 of the node 80 transmits the purchase request information transmitted from the communication terminal 10*a* to the service provider apparatus 70 (S86). Thus, the communication unit 71 of the service provider apparatus 70 receives the purchase request information transmitted from the node 80.

Next, the storing and reading unit 79 of the service provider apparatus 70 searches the data management table (see FIG. 7A) using the hash value included in the purchase request information received at S86 as a search key, to read the corresponding access key (S87).

Next, the communication unit 71 of the service provider apparatus 70 transmits, to the node 80, update request information indicating a request to update the database registered in the blockchain 8 (S88). The update request information includes the access key read at S87, the user identification information received at S86, the hash value indicating the electronic data for which information is updated, and the provider information indicating a destination (address) of the service provider apparatus 70. Accordingly, the communication unit 81 of the node 80 receives the update request information transmitted from the service provider apparatus 70.

Next, the asset processing unit 84 of the node 80 updates the asset information stored in the storage unit 8000 as illustrated in FIG. 22 (S89). Further, the transaction processing unit 83 generates transaction information corresponding to the update of the asset information at S89, as illustrated in FIG. 23 (S90). Then, the storing and reading unit 89 stores the transaction information generated by the transaction processing unit 83 in the storage unit 8000 (S91). The processing of S89 and the processing of S90 to S91 may be performed in a reverse order.

Next, the communication unit 81 of the node 80 transmits, to the service provider apparatus 70, a data update notification indicating that the data registered in the blockchain 8 has been updated (S92). The data update notification includes various kinds of information indicated in the asset information updated at S89. Accordingly, the communication unit 71 of the service provider apparatus 70 receives the data update notification transmitted from the node 80. The data manager 75 of the service provider apparatus 70 updates the owner information of the "E-book A" stored in the owner management DB 7003 (see FIG. 7B) (S93). In this example case, the data manager 75 changes the owner of the "E-book A" from "userA" to "userB". Further, the communication unit 81 transmits, to the communication terminal 10*a*, a data update notification indicating that the data registered in the blockchain 8 has been updated (S94). The data update notification includes the access key and the provider information received at S88. Then, the communication unit 11*a* of the communication terminal 10*a* transmits the data update notification transmitted from the node 80 to the communication terminal 10*b* (S95). Accordingly, the communication unit 11*b* of the communication terminal 10*b* receives the data update notification transmitted from the communication terminal 10*a*.

In this way, the ownership of "E-book A" is transferred from "userA" to "userB". Then, the user B who uses the communication terminal 10*b* becomes able to view the E-book A. The communication unit 11*b* of the communication terminal 10*b* transmits view request information indicating a request for viewing the E-book A to the service provider apparatus 70, which is the issuer of the E-book A indicated in the provider information received at S95 (S96). The view request information includes the access key of the E-book A received at S95. Accordingly, the communication unit 71 of the service provider apparatus 70 receives the view request information transmitted from the communication terminal 10*b*. The storing and reading unit 79 of the service provider apparatus 70 searches the data management table (see FIG. 7A) using the access key received by the communication unit 71 as a search key, to read electronic data of the e-book A (S97). Then, the communication unit 71 of the service provider apparatus 70 transmits the electronic data of the E-book A to the communication terminal 10*b* (S98). Thus, the communication unit 11*b* of the communication terminal 10*b* receives the electronic data transmitted from the service provider apparatus 70.

In this way, the network system 1*aa* is able to carry out transactions between a plurality of users, reliably, through communications between the plurality of communication terminals 10 (10*a*, 10*b*) even without intermediating the service management apparatus 30.

As described above, the network system 1 carries out transaction of an item to be exchanged, such as an electronic book provided from any one of a plurality of service providing apparatuses 70, between a service provider and a user, via the blockchain 8. This improves operability for the user in transaction (exchange). The network system 1 applies the blockchain 8 to the transaction between the service provider apparatus 70 and the communication terminal 10, thus improving the fault tolerance of a system as well as tamper resistance of contents to be exchanged.

Second Embodiment

Next, referring to FIGS. 25 to 31, a network system is described according to the second embodiment. The elements and functions that are same to those of the above-described example of the first embodiment are denoted by the same reference numerals, and the description thereof will be omitted. The network system 1*b* is a system for renting an item to be exchanged, as a service provided by the service provider. In the following, the item to be exchanged may be rented with a certain fee, or free.

Figure 25:
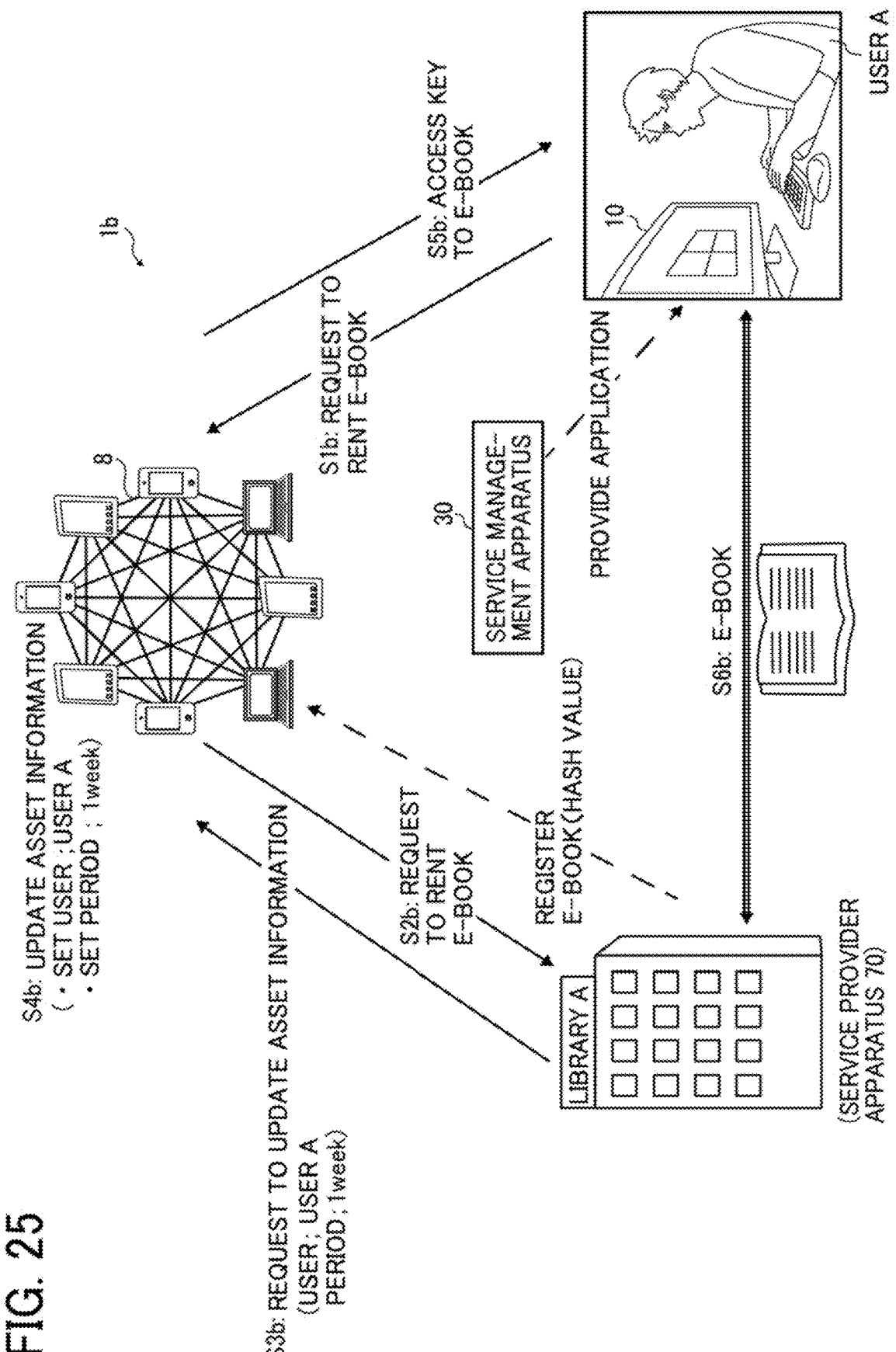
FIG. 25 is a diagram illustrating an example of an outline of processing performed by the network system according to a second embodiment.

FIG. 25 is a diagram illustrating an example of an outline of processing performed by the network system according to the second embodiment. The difference from the network system 1*a* illustrated in FIG. 4 is that, in transaction, the item to be exchanged is not purchased, but rented. The network system 1*b* manages processing of renting an item to be exchanged, such as information on a rental period or return processing, using the blockchain 8. Similarly to the example illustrated in FIG. 4, FIG. 25 illustrates an example in which an e-book is used as an example of electronic data, as an item to be exchanged.

The service provider apparatus 70 registers a hash value of an e-book to be exchanged with the user in the blockchain 8 in advance. On the blockchain 8, information on e-books to be exchanged, which are transmitted from the plurality of service provider apparatuses 70 respectively operated by the plurality of service providers, are registered as asset information.

The communication terminal 10 operated by the user A transmits a rental request for renting an e-book to the blockchain 8 by using the e-book application 170*a* (see FIG. 3) provided from the service management apparatus 30 (S1*b*). Next, the blockchain 8 transmits the rental request transmitted from the communication terminal 10 to the service provider apparatus 70 of a library A that has issued the e-book to be rented (S2*b*).

Next, the service provider apparatus 70 transmits an update request for updating the asset information to the blockchain 8 (S3*b*). Then, the blockchain 8 updates information on the user of the e-book to be rented and information on the rental period, from among the registered asset information (S4*b*). Thus, the user of the e-book issued by the library A becomes the user A for a time period until the deadline having been set expires. The blockchain 8 transmits an access key of the requested e-book to the communication terminal 10 as a request source (S5*b*).

Then, the communication terminal 10 is able to access the service provider apparatus 70 of the library A using the access key transmitted from the blockchain 8 to browse the e-book rented. When the rental period set in the blockchain 8 has elapsed, the access key is updated. As a result, the user A operating the communication terminal 10 is not able to view the e-book. As described above, the network system 1*b* updates information on the user of the e-book according to a preset use time period for management on the blockchain 8, thus improving reliability of electric data to be used for processing of renting.

FIG. 26 is a conceptual diagram illustrating an example of a user management table according to the second embodiment. The storage unit 7000 includes, in alternative to the owner management DB 7003, a user management DB 7005 implemented by the user management table illustrated in FIG. 26. The user management table stores various data including information on users of items to be exchanged, which are registered in the blockchain 8. The user management table stores a user ID for identifying a user of an item to be exchanged, a hash value uniquely assigned to the item to be exchanged, and information on the expiration date for using the item to be exchanged ("use period"), in association with one another.

FIG. 27 is a conceptual diagram illustrating an example of asset information stored in a node according to the second embodiment. The asset information illustrated in FIG. 27 includes, for each asset ID assigned to each asset, a hash value assigned by the service provider apparatus 70, a name (in this example, title of e-book) of an item to be exchanged, an issuer and a user of the item to be exchanged, a transaction amount (price) of the item to be exchanged, a rental flag indicating whether the item is rented or not, and use period information indicating a use period during when the user is allowed to use the item to be exchanged, in association with one another. Among them, the issuer indicates information on a service provider who has issued the item to be exchanged. The user indicates information on a user who rents the item exchanged, to use the electronic data in relation to the item exchanged. That is, the asset information illustrated in FIG. 27 indicates that the user described in the "user" field has a right to use the item exchanged. The transaction amount, i.e., price, may be set, for example, to "0" in case the item is rented free. In the example of FIG. 27, all items including the user, the rental flag, and the use period are left blank, and the transaction amount is set to "0". This indicates that the item to be exchanged, as an example of asset, is not rented to any user.

Figure 28:
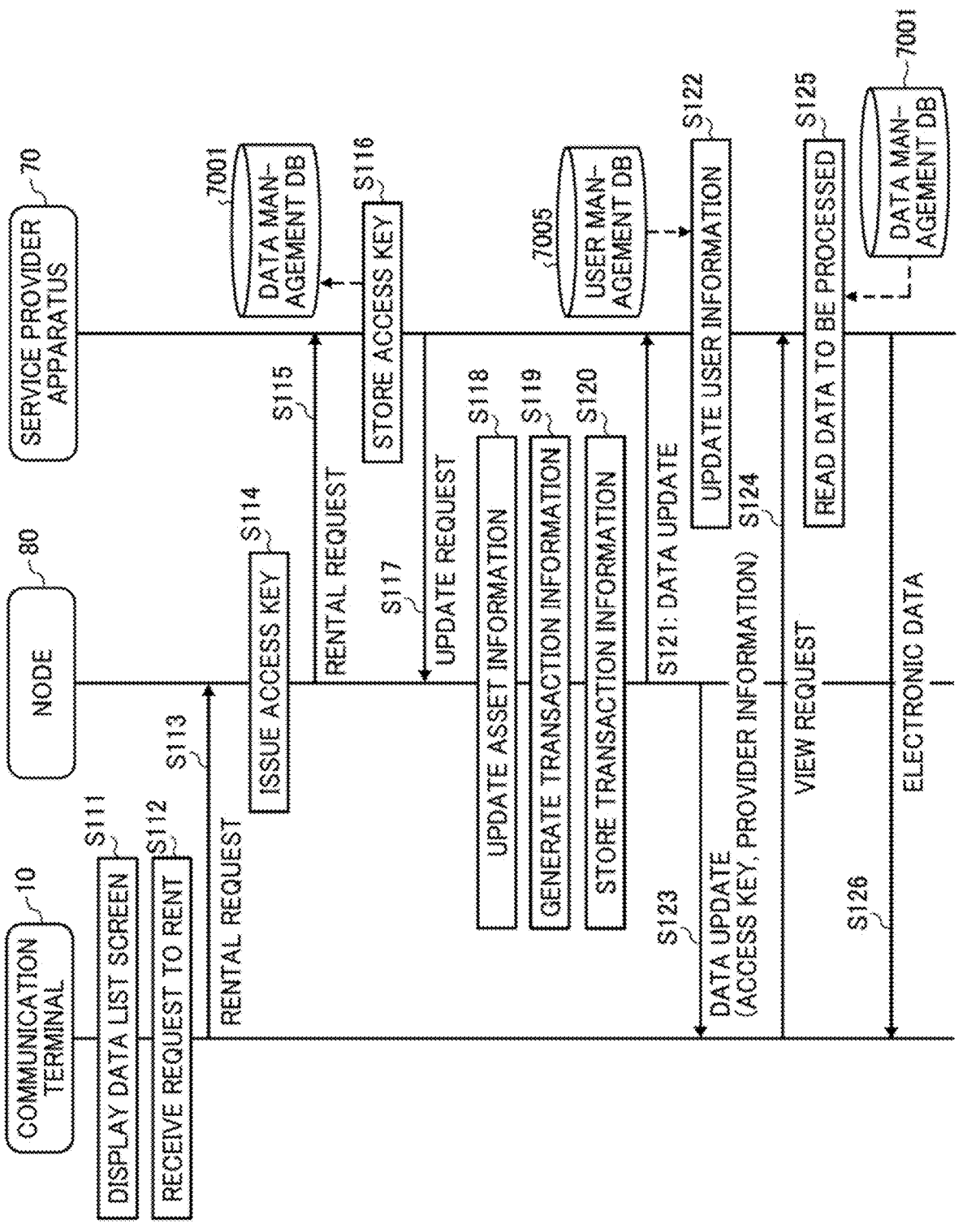
FIG. 28 is a sequence diagram illustrating an example of exchanging electronic data, performed by the network system, according to the second embodiment.

FIG. 28 is a sequence diagram illustrating an example of exchanging electronic data, performed by the network system, according to the second embodiment. Since the processes until the communication terminal 10 downloads data indicated by the asset information from the node 80 are similar to the processes from S31 to S39 in FIG. 13, the description thereof will be omitted.

Figure 29:
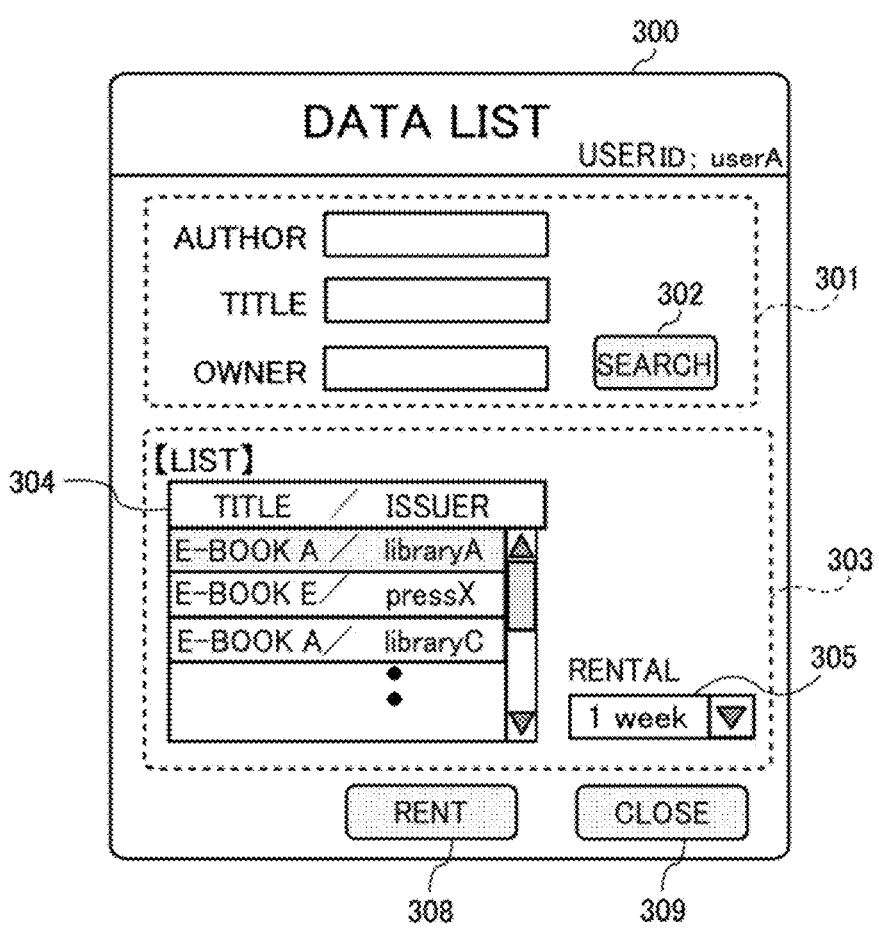
FIG. 29 is a diagram illustrating an example data list screen displayed at the communication terminal according to the second embodiment.

The display control unit 13 of the communication terminal 10 causes the display 506 to display a data list screen 300, which lists data of e-books related to the asset information transmitted from the node 80 (S111). FIG. 29 is a diagram illustrating an example data list screen displayed at the communication terminal according to the second embodiment. The data list screen 300 illustrated in FIG. 29 includes an input area 301 for inputting a search condition (parameter) for searching for an e-book, a list display area 303 indicating a search result using data input to the input area 301, a "rent" button 308 to be pressed to request to rent an e-book, and a "close" button 309 to be pressed to cancel transaction (rental) of an e-book. The input area 301 is input with bibliographic information such as an author name or a title, a keyword in relation to an item of e-book such as an owner, etc. When the "search" button 302 is pressed, the communication terminal 10 executes a search using the input information such as the input keyword. The list display area 303 displays information on the name (title) and owner of the e-book indicated in the received asset information, and a selection menu 305 for selecting a rental period of the e-book. The list display area 303 further includes a selection menu 304 that allows the user to select one or more items, from among the displayed items of asset information.

Next, when the user A selects particular data (e-book) from the selection menu 304, selects a rental period from the selection menu 305, and presses the "rent" button 308, the reception unit 12 of the communication terminal 10 receives a rental request indicating a request to rent the selected e-book (S112). In the following description, it is assumed that the "E-book A" is selected by the user A. Next, the communication unit 11 of the communication terminal 10 transmits rental request information indicating a request to rent the selected "E-book A" to the node 80 (S113). The rental request information includes user identification information (for example, a user ID) for identifying the user A, the selected rental period, and information on a hash value assigned to "E-book A". Accordingly, the communication unit 81 of the node 80 receives the rental request information transmitted from the communication terminal 10.

Next, the issuing unit 82 of the node 80 issues an access key for the e-book to be rented (S114). The communication unit 81 transmits rental request information to the service provider apparatus 70 of the service provider who is the owner of the e-book to be rented (S115). In this example, it is assumed that the node 80 previously stores information indicating an address of the service provider apparatus 70. The rental request information includes the hash value indicated in the asset information stored in the storage unit 8000 and the access key issued by the issuing unit 82. Thus, the communication unit 71 of the service provider apparatus 70 receives the rental request information transmitted from the node 80.

Next, the data manager 75 of the service provider apparatus 70 stores the hash value and the access key received by the communication unit 71 in the data management DB 7001 (see FIG. 7A) in association with each other (S116).

Next, the communication unit 71 of the service provider apparatus 70 transmits, to the node 80, update request information indicating a request to update the database registered in the blockchain 8 (S117). The update request information includes the user identification information (for example, user ID) for identifying the user A, the hash value indicating the electronic data (e-book) for which information is to be updated, and provider information indicating a destination (address) of the service provider apparatus 70. Accordingly, the communication unit 81 of the node 80 receives the update request information transmitted from the service provider apparatus 70.

The asset processing unit 84 of the node 80 updates the asset information stored in the storage unit 8000 (S118). FIG. 30 is a conceptual diagram illustrating an example of asset information updated at S118. As illustrated in FIG. 30, the asset processing unit 84 describes "userA" in the "user" field of the asset with the asset ID "C0001". The asset processing unit 84 further changes the rental flag to "rent", and describes the date and time indicated by the rental period received at S113 in the "rental period" field. As a result, the right to use the "E-book A" of the asset with the asset ID "C0001" is given to the userA identified with the user ID "userA" until the rental period expires. That is, the user A has an access right to the "E-book A" until the rental period expires.

Further, the transaction processing unit 83 generates transaction information corresponding to the update of the asset information at S118 (S119). Then, the storing and reading unit 89 stores the transaction information generated by the transaction processing unit 83 in the storage unit 8000 (S120). FIG. 31 is a conceptual diagram illustrating an example transaction information generated at S119. The transaction processing unit 83 generates a block of a new transaction in the third transaction information, so as to reflect the transaction which the use right of the E-book A is transferred from "libraryA" to "userA".

As illustrated in FIG. 31, the transaction processing unit 83 describes, in the block with the transaction ID "T0032" that is newly added, the transaction type "asset rental" that indicates processing of renting the asset to the user at S118. The transaction processing unit 83 writes, in the block identified with the transaction ID "T0032", the hash value "5yvmtwcyxqq4xq . . . " for identifying the transaction, the time stamp "2020/01/18/20:21:43" indicating the date and time when the asset is rented, and the unique information (the asset ID "C0001", the hash value "48678v9mtwppcq . . . ,", and the user "userA") regarding the allocated asset. Further, when the rental period received at S113 has elapsed, the transaction processing unit 83 newly generates a block with the transaction ID "T0033", indicating the transaction type of "asset return". In this case, the transaction processing unit 83 leaves the items of user, rental flag, and rental period, all blank. The processing of S118 and the processing of S119 to S120 may be performed in a reverse order.

Next, the communication unit 81 of the node 80 transmits, to the service provider apparatus 70, a data update notification indicating that the data registered in the blockchain 8 has been updated (S121). The data update notification includes various kinds of information indicated in the asset information updated at S118. Accordingly, the communication unit 71 of the service provider apparatus 70 receives the data update notification transmitted from the node 80. The data manager 75 of the service provider apparatus 70 updates the user information registered in the user management DB 7005 (see FIG. 26) (S122). Specifically, the data manager 75 updates the user information so as to register "userA" in the user field for "E-book A" and the information on the use period (rental period) received at S121. Further, the communication unit 81 transmits a data update notification indicating that the data registered in the blockchain 8 has been updated, to the communication terminal 10 (S123). The data update notification includes the access key issued at S114 and the provider information received at S117. Accordingly, the communication unit 11 of the communication terminal 10 receives the data update notification transmitted from the node 80.

In this way, the use right of the "E-book A" is assigned to "userA". Then, the user A who uses the communication terminal 10 becomes able to view the E-book A, for the rental period that is selected. The communication unit 11 of the communication terminal 10 transmits view request information indicating a request for viewing the E-hook A, indicated in the provider information received at S123, to the service provider apparatus 70 that is the issuer of the E-book A (S124). The view request information includes the access key of the E-book A received at S123. Accordingly, the communication unit 71 of the service provider apparatus 70 receives the view request information transmitted from the communication terminal 10. The storing and reading unit 79 of the service provider apparatus 70 searches the data management table (see FIG. 7A) using the access key received by the communication unit 71 as a search key, to read electronic data of the e-book A (S125). Then, the communication unit 71 of the service provider apparatus 70 transmits the electronic data of the E-book A to the communication terminal 10 (S126). Thus, the communication unit 11 of the communication terminal 10 receives the electronic data transmitted from the service provider apparatus 70.

In FIG. 28, at S124 to S126, when the communication terminal 10 downloads an electronic data file of a particular e-book from the service provider apparatus 70, the access key may be changed (invalidated) due to expiration of the rental period, thus restricting viewing.

Similarly to the example case illustrated in FIGS. 19 to 24 of the first embodiment, in the network system 1b according to the second embodiment, transaction (rental) may be performed between a plurality of users using a plurality of communication terminals 10 (10a, 10b).

As described above, the network system 1b manages the use right and the use period of the e-book by using the blockchain 8, thus allowing not only purchase but also rental of the e-book for a limited time period. Moreover, with the above-described method of managing the use right and the use period based on the blockchain 8, the user may rent e-book not only from one service provider destination such as a library but also from a plurality of service provider destinations.

Variations

In the above-described embodiments, a transaction between a service provider and a user, or between a plurality of users, of an item to be exchanged (transaction item), such as electronic data including an electronic book, video data, still image data, music data, voice data, or document data, has been described. Hereinafter, variations of the above-described embodiments will be described. The examples described below illustrate the case in which the item to be exchanged (transaction item) is not electronic data but a tangible commodity.

Figure 32:
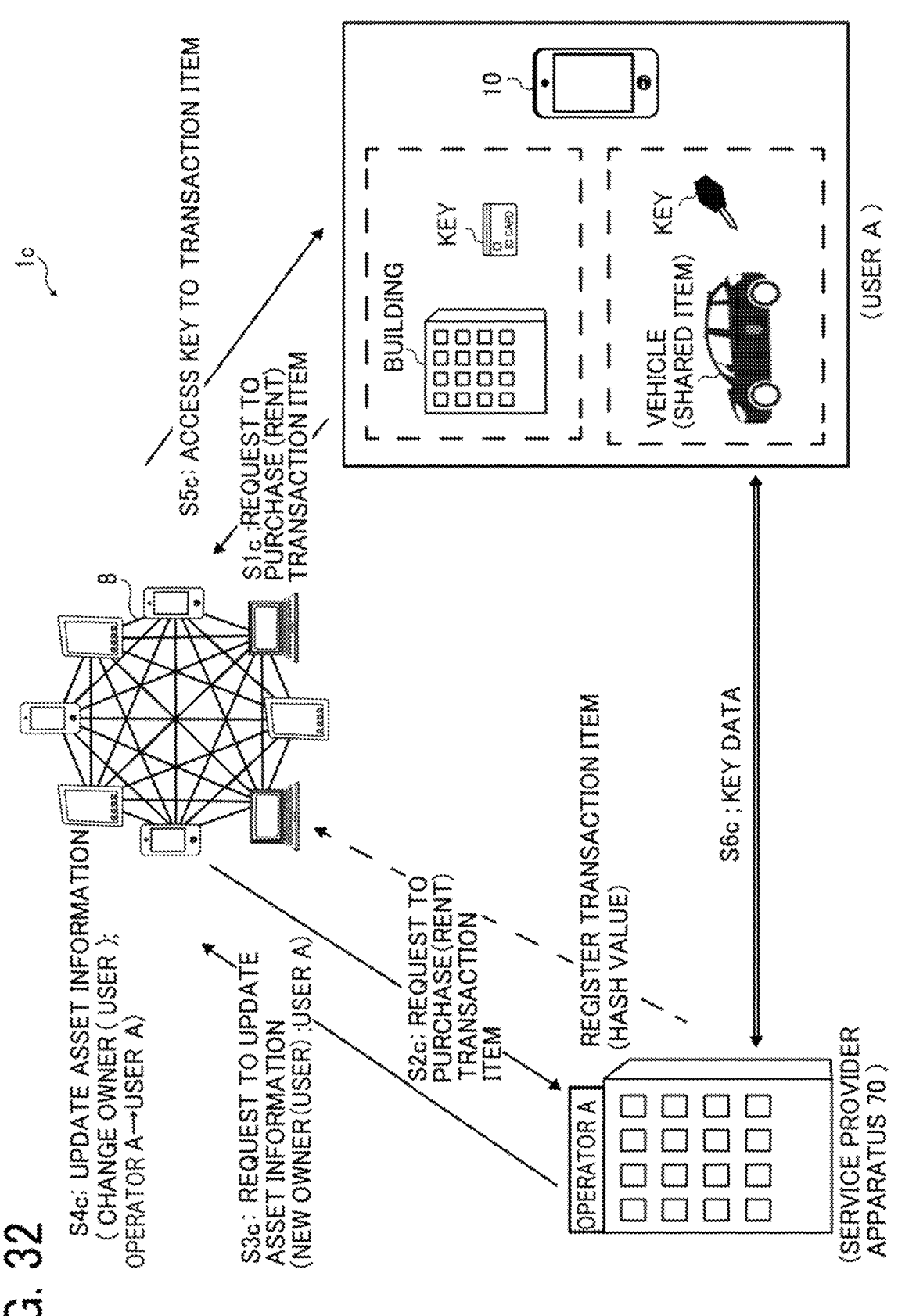
FIG. 32 is a diagram illustrating example processing performed by the network system according to another embodiment.

FIG. 32 is a diagram illustrating an example of an outline of processing performed by the network system according to a variation of the second embodiment. The network system 1c illustrated in FIG. 32 is a system in which a service provider provides a user with an electronic key, which is an example of accompanying data that accompanies an item to be exchanged, in exchange of the item.

One example is the case where the item to be exchanged is a space, such as a room. As illustrated in FIG. 32, in such example, the user A uses an electronic key to enter and leave a building, or any room in the building, such as an apartment. At this time, the user A operates the communication terminal 10 to acquire electronic key data used for unlocking an electronic lock, from the service provider. The electronic key data is, for example, accompanying data accompanying the item to be exchanged, such as the building or each room in the building.

Another example is the case where the item to be exchanged is any item to be shared by a plurality of users, for example, a vehicle. In such case, the user A operates the communication terminal 10 to acquire electronic key data used for unlocking an electronic lock for using the shared item from the service provider, as accompanying data accompanying a transaction (sharing) of the item to be shared. The item to be shared is any item, which could be even a service or information, which a plurality of persons or organizations use in common. Further, the item to be shared is not limited to a vehicle, but may be an electronic device such as a PC shared by a plurality of users, a space such as a conference room or a place. Examples of the vehicle include a car, a motorcycle, a bicycle, and a wheelchair. The detailed processing will be described below.

Example operation for any of the above-described examples is described referring to FIG. 32. In this specific example, the service provider is a business operator A.

The communication terminal 10 of the user A transmits a request for purchasing or renting the item to be exchanged (transaction item) to the blockchain 8 (S1c). Next, the blockchain 8 transmits the request transmitted from the communication terminal 10 to the service provider apparatus 70, operated by the business operator A that handles the item that is requested (S2c).

Next, the service provider apparatus 70 transmits an update request for updating the asset information to the blockchain 8 (S3c). Then, the blockchain 8 updates the information on the owner or the user of the item to be exchanged, from among the registered asset information (S4c). In this way, the owner or user of the item to be exchanged is changed from the business operator A to the user A. The blockchain 8 transmits an access key of the requested item to be exchanged, to the communication terminal 10 as a request source (S5c).

Then, the user A accesses the service provider apparatus 70 of the business operator A by using the access key transmitted from the blockchain 8 to acquire the electronic key data of the item for which purchase or rental has been requested (S6c). By registering the acquired electronic key data for the electronic key for the particular item, the communication terminal 10 allows the user to enter or leave a building, which is an example item to be exchanged, or allows the user to use the item to be shared. The communication terminal 10 may additionally have a function as an electronic key. As described above, in response to the request for exchange (i.e., purchase or rental) of the item from the user A, at the network system 1c, the service provider apparatus 70 transmits the accompanying data of the item, such as the electronic key, to the communication terminal 10.

In alternative to the electronic key, any other electronic data may be used as the accompanying data accompanying the item exchanged, for example, as described below.

Figure 33:
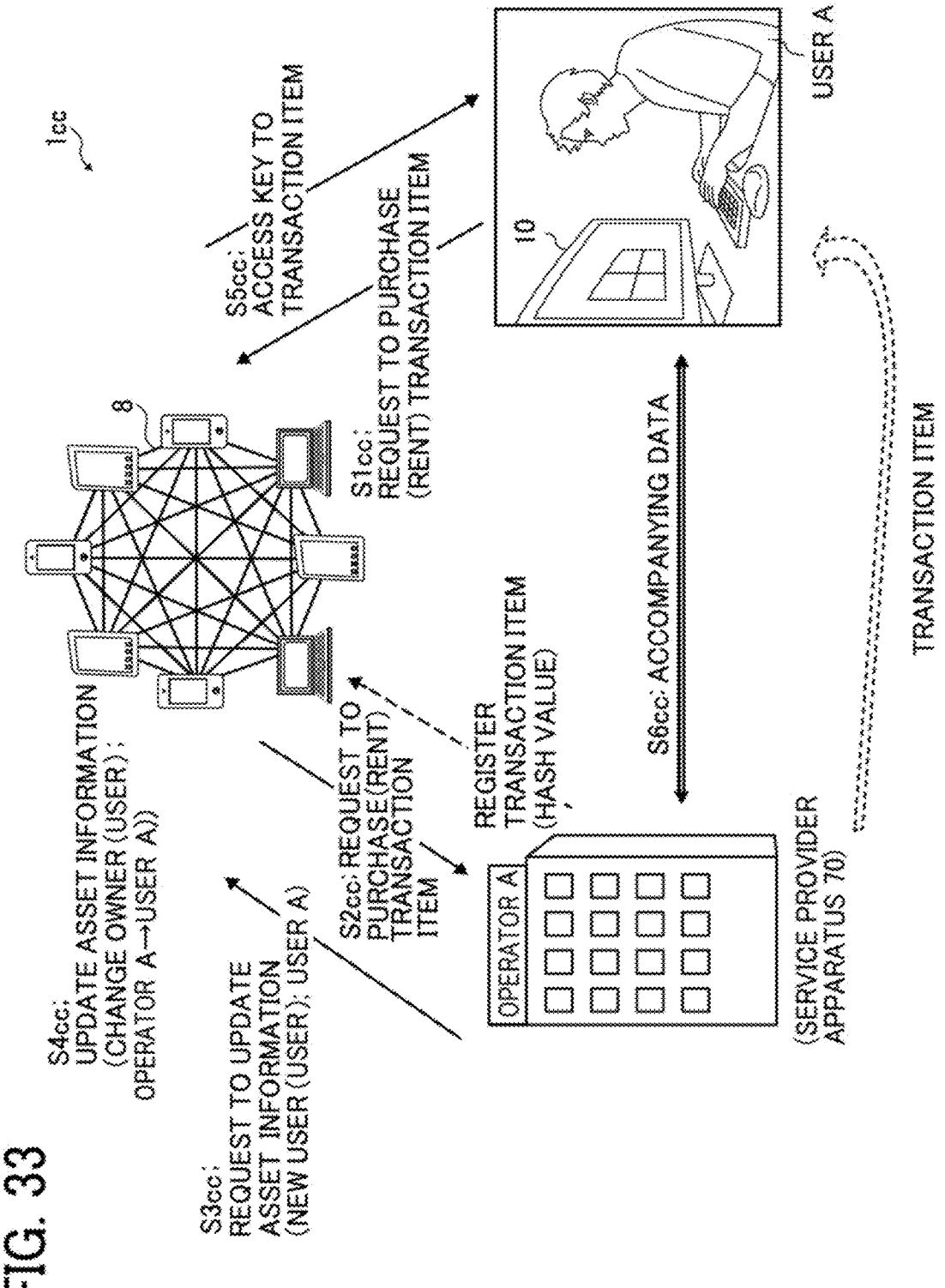
FIG. 33 is a diagram illustrating example processing performed by the network system according to another embodiment.

In the network system 1cc illustrated in FIG. 33, in response to a request from the communication terminal 10, the service provider apparatus 70 transmits electronic data (accompanying data) accompanying the item exchanged (transaction item), such as an instruction manual of the item exchanged, to the communication terminal 10. The item to be exchanged, such as a product for transaction, is delivered from the service provider to the user A, by any means such as by shipping or hand. When the transaction with the user A for the item to be exchanged is concluded, the service provider apparatus 70 may transmit accompanying data such as a contract or an instruction manual of the item exchanged to the communication terminal 10. The service provider apparatus 70 further causes delivery of the item exchanged to the user A, for example, by shipping or hand. Since the processing from S1cc to S6cc illustrated in FIG. 33 is similar to the processing from S1c to S6c illustrated in FIG. 32, the description thereof will be omitted.

As described above, the network systems 1c and 1cc according to the variations of the embodiments each carries out transactions of the use right of the item exchanged on the blockchain 8, and transmits the accompanying data of the item exchanged from the service provider apparatus 70 to the communication terminal 10. Thus, even when the item to be exchanged (transaction item), or the accompanying data, needs to be delivered physically, reliable transaction is made possible.

As described above, according to one or more embodiments, the service provider apparatus 70 communicates with the blockchain 8 that stores information on a use right of an item to be exchanged (for example, an electronic book) provided by a service provider. The service provider apparatus 70 receives a transaction request of the item to be exchanged, provided by the service provider, from the communication terminal 10. The service provider apparatus 70 further transmits a request to change the use right of the item to be exchanged to the blockchain 8. Then, the service provider apparatus 70 provides the item to be exchanged, or accompanying data accompanying the item to be exchanged, to the communication terminal 10 of the user having the use right that is transferred in response to the change request. In this way, the service provider apparatus 70 uses information on the use right of the item to be exchanged, managed on the blockchain 8, so as to improve operability in processing exchange of the item between the service provider and the user. Through use of the blockchain 8 having high tamper resistance in exchange (transaction), the service provider apparatus 70 can reduce the burden in managing the item to be exchanged, or increase the reliability of data related to the user of the item to be exchanged.

Further, for the service provider apparatus according to an embodiment, the item to be exchanged is, for example, electronic data provided by the service provider. The use right is, for example, a right to access the electronic data. The change request transmitted to the blockchain 8 includes user identification information (for example, a user ID) for identifying a user who uses the communication terminal 10. The use right for using the item to be exchanged is assigned to a user identified with the user identification information. The service provider apparatus 70 allows the blockchain 8 to manage information on the user having the right to access the electronic data, thus allowing only the user having the access right to view the electronic data.

Further, at the service provider apparatus 70 according to an embodiment, the change request transmitted to the blockchain 8 includes time period information indicating a time period during when the use of the item to be exchanged is allowed, such as a time when use of the item expires. The use right of the item to be exchanged is assigned to the user identified with the user identification information (for example, the user ID) until the use time period, indicated by the time period information, elapses. Accordingly, the service provider apparatus 70 is able to manage the use right and the use period of the item to be exchanged using the blockchain 8, thus allowing the user to rent the item to be exchanged.

Further, according to one or more embodiments, a network system 1 (1a, 1aa, 1b) includes a service provider apparatus 70 capable of communicating with a blockchain 8 that stores information on a use right of an item to be exchanged, provided from a service provider, and a communication terminal 10 capable of communicating with the service provider apparatus 70. The service provider apparatus 70 receives a transaction request of the item to be exchanged, provided by the service provider, from the communication terminal 10. The service provider apparatus 70 further transmits a request to change the use right of the item to be exchanged to the blockchain 8. Then, the service provider apparatus 70 provides the item to be exchanged, or accompanying data accompanying the item to be exchanged, to the communication terminal 10 having the use right, due to the change made in response to the change request. The communication terminal 10 transmits an acquisition request for acquiring an item to be exchanged. The communication terminal 10 acquires the item to be exchanged, or accompanying data accompanying the item to be exchanged, provided from the service provider apparatus 70, in response to the acquisition request. Accordingly, the network system 1 (1a, 1aa, 1b) manages information on the use right of the item to be exchanged using the blockchain 8. This improves operability in processing exchange (transaction) between the service provider apparatus 70 and the communication terminal 10.

Furthermore, according to one or more embodiments, the network system includes a service management apparatus 30 (an example of a management apparatus) that manages exchange (transactions) between the plurality of communication terminals 10 (10a, 10b). The service management apparatus 30 receives a transaction request from the communication terminals 10b. The service management apparatus 30 then receives an approval notification that approves the transaction request from another communication terminal 10a operated by a user having a right to use the item to be exchanged. In response to the approval notification, the service management apparatus 30 transmits a change request for changing the use right of the item to be exchanged, to the blockchain 8. As described above, by using the information managed on the blockchain 8, the network system 1aa is able to carry out, not only a transaction between a user and a service provider, but also a transaction between a plurality of users, while keeping reliability at a sufficient level.

According to one or more embodiments, a node 80 on the blockchain 8 that manages use right of an item to be exchanged between a service provider apparatus 70 and a communication terminal 10, is provided. The node 80 receives identification information (for example, a hash value) of the item to be exchanged, from the service provider apparatus 70. The node 80 generates asset information indicating the received identification information, and the use right of the item to be exchanged that is associated with the received identification information. Further, the node 80 receives, from the service provider apparatus 70, a change request for changing the right to use the item to be exchanged. The change request includes user identification information for identifying a user who uses the communication terminal 10. The node 80 changes the use right, indicated in the generated asset information, to indicate the user identified with the user identification information included in the received change request. Accordingly, the node 80 manages the right to use the item to be exchanged, between the user and the service provider, on the blockchain 8. This can improve operability and reliability in processing exchange (transactions) between the user and the service provider.

Each of the functions of the embodiments described above can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

Further, various tables of any one of the above-described embodiments may be generated by machine learning, and data of associated items can be classified such that use of tables can be optional. In the present disclosure, machine learning is a technique that enables a computer to acquire human-like learning ability. Machine learning refers to a technology in which a computer autonomously generates an algorithm required for determination such as data identification from learning data loaded in advance, and applies the generated algorithm to new data to make a prediction. Any suitable learning method is applied for machine learning, for example, any one of supervised learning, unsupervised learning, semi-supervised learning, reinforcement learning, and deep learning, or a combination of two or more those learning.

One or more embodiments of the service provider apparatus, service providing system, network system, service providing method, computer program, node, and blockchain are described above. The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

In one example, the present invention may reside on an apparatus for providing services, communicable with a blockchain that stores information on a use right of a transaction item provided from a service provider. The apparatus includes circuitry that receives a transaction request for an item, from a communication terminal; transmits a change request for changing a use right of the transaction item to the blockchain network; and provide the transaction item to a communication terminal having the use right, due to the change made by the blockchain based on the change request.

In one example, the transaction item is electronic data provided by the service provider, and the use right is a right to access the electronic data.

In one example, the change request includes user identification information identifying the user using the communication terminal. The user identified with the user identification information is assigned with the use right.

In one example, the change request includes time period information indicating a time period for using the transaction item. The user identified with the user identification information is assigned with the use right, until a time period indicated by the time period information elapses.

In one example, the apparatus provides the transaction item to the communication terminal, when the use right has been assigned by the blockchain.

The transaction item may be any one of electronic book, video data, still image data, music data, voice data, or document data.

In one example, the present invention may reside in an apparatus for providing services, communicable with a blockchain that stores information on a use right of a transaction item provided by a service provider. The apparatus includes circuitry that receives a transaction request for an item, from a communication terminal; transmits a change request for changing a use right of the transaction item to the blockchain network; and provide accompanying data accompanying the transaction item to a communication terminal having the use right, due to the change made by the blockchain based on the change request.

In one example, the change request includes user identification information identifying the user using the communication terminal. The user identified with the user identification information is assigned with the use right.

In one example, the apparatus provides the accompanying data to the communication terminal, when the use right has been assigned by the blockchain.

In one example, the accompanying data is electronic data of a certificate that certifies a consumed electric power or a production method of electricity.

In one example, the transaction item is a shared item to be shared among a plurality of users, and the accompanying data is an electronic key for using the shared item.

In one example, the circuitry of the apparatus for providing services further receives, from the blockchain, information indicating the use right that is changed by the blockchain due to the change request, and provides the transaction item to the communication terminal corresponding to the information indicating the use right that is received.

In one example, the present invention may reside in a system for providing services, including an apparatus for providing services communicable with a blockchain that stores information on a use right of a transaction item provided by a service provider. The system includes circuitry that receives a transaction request for an item, from a communication terminal; transmits a change request for changing a use right of the transaction item to the blockchain network; and provide the transaction item to a communication terminal having the use right, due to the change made by the blockchain based on the change request.

In one example, the present invention may reside on a network system including: an apparatus for providing services, communicable with a blockchain that stores information on a use right of a transaction item provided by a service provider; and a communication terminal communicable with the apparatus for providing services. The apparatus for providing services includes circuitry that receives a transaction request for an item, from a communication terminal; transmits a change request for changing a use right of the transaction item to the blockchain network; and provide the transaction item to a communication terminal having the use right, due to the change made by the blockchain based on the change request. The communication terminal includes circuitry that transmits a request for obtaining the transaction item, and obtains the transaction item or accompanying data accompanying the transaction item, from the apparatus for providing services in response to the request for obtaining, In one example, the above-described network system further includes a management apparatus that manages transactions between a plurality of communication terminals. The management apparatus includes circuitry that receives the transaction request from the communication terminal, and transmits the change request to the blockchain network in response to reception of approval to the transaction request from another communication terminal of a user having the use right of the transaction item.

In one example, the present invention may reside in a method for providing services, performed by an apparatus for providing services, communicable with a blockchain that stores information on a use right of a transaction item provided by a service provider. The method includes: receiving a transaction request for the transaction item from a communication terminal; transmitting to the blockchain a change request for changing the use right of the transaction item; and providing the transaction item or accompanying data accompanying the transaction item to the communication terminal having the use right, due to the change made by the blockchain based on the change request.

In one example, the present invention may reside in a node, on a blockchain that manages use right of a transaction item to be exchanged between an apparatus for providing services and a communication terminal. The node includes circuitry that receives identification information of the transaction item from the apparatus for providing services, and generates asset information that indicates the identification information, and the use right of the transaction item associated with the identification information. The circuitry of the node further receives a change request for changing the use right, including user identification information identifying the user operating the communication terminal. The circuitry of the node changes the use right, indicated by the generated asset information, to be assigned to the user identified with the user identification information included in the received change request.

In one example, the present invention may reside in a blockchain that manages use right of a transaction item to be exchanged between an apparatus for providing services and a communication terminal. The blockchain includes circuitry that receives identification information of the transaction item from the apparatus for providing services, and generates asset information that indicates the identification information, and the use right of the transaction item associated with the identification information. The circuitry of the blockchain further receives a change request for changing the use right, including user identification information identifying the user operating the communication terminal. The circuitry of the blockchain changes the use right, indicated by the generated asset information, to be assigned to the user identified with the user identification information included in the received change request.

The invention claimed is:

1. A system for providing services, the system comprising:

a service provider apparatus communicably connected with a blockchain system, the service provider apparatus including first circuitry;

a communication terminal of a user, the communication terminal communicably connected with the service provider apparatus via a network, the communication terminal including second circuitry; and at least one node on the blockchain system including:

third circuitry; and a memory that stores, for each item of one or more items provided by one or more service providers, asset information including identification information identifying the item and information on a use right of the item, wherein the second circuitry is configured to:

transmit a first request to the blockchain system, the first request for obtaining a particular item of the one or more items provided by the one or more providers;

receive an access key from the at least one node on the blockchain system;

transmit a view request including the access key to the apparatus; and obtain the particular item provided by the service provider apparatus in response to the first request, the third circuitry is configured to:

receive the first request from the communication terminal:

transmit a second request to the service provider apparatus:

receive an update request including user identification information of the user from the service provider apparatus;

in response to reception of the update request, update the asset information generated for the particular item, such that the information on the use right of the particular item, included in the updated asset information, is changed to indicate that the user right is assigned to the user identified with the user identification information included in the update request;

generate transaction information associated with processing to update the use right of the particular item, including the user identification information of the user; and transmit, to the service provider apparatus, a notification indicating updating of the information stored in the blockchain system, and the first circuitry is configured to:

receive a second request transmitted from the blockchain system;

transmit, to the blockchain system, the update request for changing the information on the use right of the particular item to indicate transfer of the use right to the user;

receive the notification from the blockchain system; and provide the particular item to the communication terminal of the user having the use right of the particular item having been transferred in response to reception of the view request.

2. The system of claim 1, wherein the notification indicates the change of the user having the use right to the apparatus for providing the particular service.

3. The system of claim 1, wherein the second circuitry is configured to receive, from the blockchain system in response to the first request for the particular item, information used for accessing the particular item.

4. The system of claim 1, further comprising another communication terminal of another user having the use right of the particular item, the another communication terminal including another circuitry configured to:

receive the first request for the particular item from the communication terminal; and transmit the update request to the blockchain system, based on approval of the first request for the particular item.

\* \* \* \* \*